United States Patent
Sprogis et al.

(10) Patent No.: US 7,143,010 B2
(45) Date of Patent: Nov. 28, 2006

(54) SYSTEM AND METHOD FOR REMOTELY MONITORING, DIAGNOSING, INTERVENING WITH AND REPORTING PROBLEMS WITH CINEMATIC EQUIPMENT

(75) Inventors: David H. Sprogis, Watertown, MA (US); Dan U. Zehme, Medfield, MA (US)

(73) Assignee: CineCast, LLC, Cambridge, MA (US)

( * ) Notice: Subject to any disclaimer, the term of this patent is extended or adjusted under 35 U.S.C. 154(b) by 0 days.

(21) Appl. No.: 11/248,344

(22) Filed: Oct. 12, 2005

(65) Prior Publication Data
US 2006/0030952 A1 Feb. 9, 2006

(51) Int. Cl.
*G06F 11/00* (2006.01)
*H04N 7/18* (2006.01)

(52) U.S. Cl. .......................... 702/188; 725/74; 725/82
(58) Field of Classification Search ........ 702/179–182, 702/187–188; 725/8, 34, 36, 66, 67, 80, 725/82, 95, 146, 10, 14–15; 709/207
See application file for complete search history.

(56) References Cited

U.S. PATENT DOCUMENTS

| | | | |
|---|---|---|---|
| 4,761,641 A | 8/1988 | Schreiber ..................... 345/1.3 |
| 5,133,079 A | 7/1992 | Ballantyne et al. ......... 725/146 |
| 5,227,874 A | 7/1993 | Von Kohorn ................ 705/10 |
| 5,381,476 A | 1/1995 | Kimoto et al. .............. 380/201 |
| 5,392,066 A | 2/1995 | Fisher et al. ................. 725/66 |
| 5,412,416 A | 5/1995 | Nemirofsky ................ 725/36 |
| 5,521,631 A | 5/1996 | Budow et al. ................ 725/78 |
| 5,568,181 A | 10/1996 | Greenwood et al. ......... 725/92 |
| 5,761,601 A | 6/1998 | Nemirofsky et al. ......... 725/34 |
| 5,801,754 A | 9/1998 | Ruybal et al. ................ 725/65 |
| 5,838,314 A | 11/1998 | Neel et al. ..................... 725/8 |
| 5,892,535 A | 4/1999 | Allen et al. .................. 725/36 |
| 5,907,322 A | 5/1999 | Kelly et al. |
| 5,924,013 A | 7/1999 | Guido et al. ................. 725/67 |
| 5,955,710 A | 9/1999 | DiFranza ................... 187/396 |
| 5,983,069 A | 11/1999 | Cho et al. .................... 725/67 |
| 6,009,465 A | 12/1999 | Decker et al. ............... 725/82 |
| 6,026,368 A | 2/2000 | Brown et al. ................ 705/14 |
| 6,026,369 A | 2/2000 | Capek ......................... 705/14 |
| 6,038,367 A | 3/2000 | Abecassis .................... 386/46 |
| 6,038,545 A | 3/2000 | Mandeberg .................. 705/15 |
| 6,141,530 A | 10/2000 | Rabowsky ................. 725/116 |
| 6,257,982 B1 | 7/2001 | Rider et al. .................. 463/31 |

(Continued)

FOREIGN PATENT DOCUMENTS

CA 2231376 3/1997

(Continued)

OTHER PUBLICATIONS

Scala InfoChannel Product Manual. Bothmans.bk : Ch20.doc. Jul. 23, 1996. pp. 1-76.

(Continued)

*Primary Examiner*—Bryan Bui
*Assistant Examiner*—John Le
(74) *Attorney, Agent, or Firm*—Gauthier & Connors LLP

(57) ABSTRACT

A system is disclosed for communicating with, and receiving data representative of equipment state and status from, movie theatre equipment in theatres. The system includes a central computer storage unit for receiving and storing data representative of equipment state and status, and a plurality of remote computer storage units coupled to the central computer storage unit for transmitting data representative of equipment state and status. Each of the plurality of remote computer storage units includes a first remote computer storage unit coupled to at least one theatre automation unit for detecting and transmitting data representative of automation equipment state and status.

23 Claims, 18 Drawing Sheets

U.S. PATENT DOCUMENTS

| | | | |
|---|---|---|---|
| 6,384,893 B1 | 5/2002 | Mercs et al. | 352/133 |
| 6,386,985 B1 | 5/2002 | Rackham | 472/75 |
| 6,424,998 B1 | 7/2002 | Hunter | 709/207 |
| 6,954,718 B1 * | 10/2005 | Akers et al. | 702/188 |
| 2001/0044726 A1 | 11/2001 | Li et al. | 704/277 |
| 2002/0095679 A1 | 7/2002 | Bonini | 725/74 |
| 2002/0116157 A1 | 8/2002 | Derwin et al. | 702/188 |

FOREIGN PATENT DOCUMENTS

| | | |
|---|---|---|
| EP | 0424648 | 5/1991 |
| EP | 0572090 | 1/1993 |
| WO | WO99/08216 | 2/1999 |
| WO | WO99/36341 | 7/1999 |
| WO | WO00/00917 | 1/2000 |

OTHER PUBLICATIONS

Hilderbrand, Carol. "Movie Technology Puts an End to Bad Endings." and Daly, James "Quiet on the set! Lights, camera, digitize." ComputerWorld Leaflet. p. 1.

Digital Programe Delivery: Digital Cinema. United Artists. Jul. 1994. pp. 1-17.

Mendrala, Jim. "A Brief History of Film and Digital Cinema." Jul. 1, 2002. pp. 1-11.

Takahashi, Dean. "Pac Bell Plans New Way to Get Films to Theaters." *The Los Angeles Times*. Apr. 28, 1992. Los Angeles, CA. pp. 1-2.

E Cinema- Main Report. pp. 1-23.

Jorgensen, Kjetil. "CAPA Enters New Advertising Channel." Dagens Naeringsliv. Aug. 5, 1998. p. 1.

Griffiths, David. Letter to Chris Hagan. Dec. 15, 1999. pp. 1-2.

E-Cinema Alert #85. Screen Digest. Oct. 4, 2002. pp. 1-11.

E-Cinema Alert #86. Screen Digest. Oct. 14, 2002. pp. 1-11.

Contract Document (no translation) Oslo, Norway. Feb. 11, 1998. pp. 1-3.

Contract Document. (no translation) Bergen. Jan. 1, 1999. pp. 1-3.

Fox, David J. "Pacific Bell Unveils a New Way of Looking at Movies Technology: A high-definition digital projection sent over fiber-optic telephone lines would eliminate film." *The Los Angeles Times*. Nov. 2, 1993. Los Angeles, CA. pp. 1-2.

Movies get a chunk of ad dollars from the Miami Herald dated Jan. 25, 1987.

CineCast HD internet product summary dated 1998.

Cyberstar press release dated Nov. 9, 1998.

DTDS trademark information filed Dec. 30, 1999.

MultiMedia at Work; *A High-Resolution Video Server for Cinema of the Future*; Lev Vaitzlit; Fall 1995, No. 3, P. 65-69.

Pacific Bell Will Deliver Movies to Theaters by Laura Evenson; San Francisco Chronicle dated Mar. 21, 1994.

Coming soon to a theater near you: Local digital ads by Paul Gough; Media Daily News; Aug. 23, 2002.

Proxima and NCN partnership from Business Wire dated Jun. 25, 1999.

Partnership formed for e-cinema advertising from Screen Digest; n33; Jul. 1999.

NCNInc.com background information printed Sep. 25, 2002.

\* cited by examiner

| EXHIBITOR | SITE | JOB SCHEDULINGS | | | INCOMPLETE BREAKDOWN | | | | | | | |
|---|---|---|---|---|---|---|---|---|---|---|---|---|
| | | COMPLETE | INCOMPLETE | TOTAL | EXHIBITOR | HARDWARE | SOFTWARE | CONTENT | BUGS | INSTALLATION | MAINTENANCE | UNKNOWN |
| NAME 1 | SITE 1 | 179 / 66.3% | 91 / 33.7% | 270 | 83 / 30.7% | 0 / 0.0% | 2 / 0.7% | 0 / 0.0% | 0 / 0.0% | 0 / 0.0% | 0 / 0.0% | 6 / 2.2% |
| NAME 2 | SITE 1 | 8653 / 90.7% | 889 / 9.3% | 9542 | 884 / 9.3% | 0 / 0.0% | 0 / 0.0% | 5 / 0.1% | 0 / 0.0% | 0 / 0.0% | 0 / 0.0% | 0 / 0.0% |
| NAME 2 | SITE 2 | 18709 / 81.3% | 4300 / 18.7% | 23009 | 1718 / 7.5% | 0 / 0.0% | 860 / 3.7% | 1 / 0.0% | 1638 / 7.1% | 0 / 0.0% | 0 / 0.0% | 83 / 0.4% |
| NAME 2 | SITE 3 | 26250 / 98.3% | 467 / 1.7% | 26717 | 364 / 1.4% | 101 / 0.4% | 2 / 0.0% | 0 / 0.0% | 0 / 0.0% | 0 / 0.0% | 0 / 0.0% | 0 / 0.0% |
| NAME 2 | SITE 4 | 27599 / 93.0% | 2080 / 7.0% | 29679 | 1721 / 5.8% | 112 / 0.4% | 244 / 0.8% | 3 / 0.0% | 0 / 0.0% | 0 / 0.0% | 0 / 0.0% | 0 / 0.0% |
| NAME 2 | SITE 5 | 30265 / 97.9% | 660 / 2.1% | 30925 | 625 / 2.0% | 28 / 0.1% | 7 / 0.0% | 0 / 0.0% | 0 / 0.0% | 0 / 0.0% | 0 / 0.0% | 0 / 0.0% |
| NAME 2 | SITE 6 | 72913 / 99.0% | 709 / 1.0% | 73622 | 449 / 0.6% | 217 / 0.3% | 3 / 0.0% | 40 / 0.1% | 0 / 0.0% | 0 / 0.0% | 0 / 0.0% | 0 / 0.0% |
| NAME 2 | SITE 7 | 13458 / 94.8% | 732 / 5.2% | 14190 | 724 / 5.1% | 0 / 0.0% | 1 / 0.0% | 7 / 0.0% | 0 / 0.0% | 0 / 0.0% | 0 / 0.0% | 0 / 0.0% |
| NAME 2 | SITE 8 | 31989 / 94.4% | 1887 / 5.6% | 33876 | 1745 / 5.2% | 140 / 0.4% | 1 / 0.0% | 1 / 0.0% | 0 / 0.0% | 0 / 0.0% | 0 / 0.0% | 0 / 0.0% |
| NAME 2 | SITE 9 | 15832 / 95.5% | 738 / 4.5% | 16570 | 699 / 4.2% | 32 / 0.2% | 2 / 0.0% | 0 / 0.0% | 0 / 0.0% | 0 / 0.0% | 0 / 0.0% | 5 / 0.0% |
| TOTAL | | 245847 / 95.1% | 12553 / 4.9% | 258400 | 9012 / 3.5% | 630 / 0.2% | 1122 / 0.4% | 57 / 0.0% | 1638 / 0.6% | 0 / 0.0% | 0 / 0.0% | 94 / 0.0% |

130 — JOB SCHEDULINGS
132 — TOTAL
134 — INCOMPLETE BREAKDOWN

FIG. 9

| SHOW ID | SHOW DATE | SHOW TIME | SHOW MISS REASON | SCREEN | SITE | EXH. INC. SCHED | HW INC. SCHED | SW INC. SCHED | CON. INC. SCHED | BUGS INC. SCHED | UNK. INC. SCHED |
|---|---|---|---|---|---|---|---|---|---|---|---|
| 140114 | 10/22/2002 | 12:32 PM | INCOMPLETE JOBS DUE TO: HARD DISK ERRORS (10/22/02 11:42 AM-10/23/02 5:36 PM) | CINEMA 1 | SITE NAME 1 | | 0 | 10 | 0 | 0 | 0 |
| 143428 | 10/22/2002 | 3:17 PM | INCOMPLETE JOBS DUE TO: HARD DISK ERRORS (10/22/02 11:42 AM-10/23/02 5:36 PM) | CINEMA 1 | SITE NAME 1 | | 0 | 6 | 0 | 0 | 0 |
| 143429 | 10/22/2002 | 5:37 PM | INCOMPLETE JOBS DUE TO: HARD DISK ERRORS (10/22/02 11:42 AM-10/23/02 5:36 PM) | CINEMA 1 | SITE NAME 1 | | 0 | 10 | 0 | 0 | 0 |
| 143430 | 10/22/2002 | 8:17 PM | INCOMPLETE JOBS DUE TO: HARD DISK ERRORS (10/22/02 11:42 AM-10/23/02 5:36 PM) | CINEMA 1 | SITE NAME 1 | | 0 | 9 | 0 | 0 | 0 |
| 143431 | 10/22/2002 | 10:47 PM | INCOMPLETE JOBS DUE TO: HARD DISK ERRORS (10/22/02 11:42 AM-10/23/02 5:36 PM) | CINEMA 1 | SITE NAME 1 | | 0 | 10 | 0 | 0 | 0 |
| 143484 | 10/23/2002 | 12:32 PM | INCOMPLETE JOBS DUE TO: HARD DISK ERRORS (10/22/02 11:42 AM-10/23/02 5:36 PM) | CINEMA 1 | SITE NAME 1 | | 0 | 1 | 0 | 0 | 0 |
| 144014 | 10/23/2002 | 3:17 PM | INCOMPLETE JOBS DUE TO: HARD DISK ERRORS (10/22/02 11:42 AM-10/23/02 5:36 PM) | CINEMA 1 | SITE NAME 1 | | 0 | 10 | 0 | 0 | 0 |
| 144368 | 10/23/2002 | 5:37 PM | INCOMPLETE JOBS DUE TO: HARD DISK ERRORS (10/22/02 11:42 AM-10/23/02 5:36 PM) | CINEMA 1 | SITE NAME 1 | | 0 | 9 | 0 | 0 | 0 |
| 137685 | 10/11/2002 | 11:12 AM | INCOMPLETE JOBS DUE TO: BLINKING ACTIVATION CABLE (10/10/02 3:27 PM-10/11/02 2:00 PM) | CINEMA 8 | SITE NAME 1 | | 0 | 12 | 0 | 0 | 0 |
| 138500 | 10/11/2002 | 1:27 PM | INTERRUPTED SHOW DUE TO: BLINKING ACTIVATION CABLE (10/10/02 3:27 PM-10/11/02 2:00 PM) | CINEMA 8 | SITE NAME 1 | | 0 | 1 | 0 | 0 | 0 |
| 139236 | 10/14/2002 | 2:42 PM | SHORT SHOW DUE TO: LONG REBOOT; NOT ACTIVATED | CINEMA 11 | SITE NAME 1 | 1 | 0 | 10 | 0 | 0 | 0 |

FIG. 10

| SITE | SCREEN | START | DUR. | RESOLVED | IMPACT | COMPONENT | FAULT CLASS |
|---|---|---|---|---|---|---|---|
| 150 | 152 | 154 | 156 | 158 | 160 | 162 | 164 |
| SITE 1 | CINEMA 8 | 10/10/02 15:27:09 | 22:32:51 | RESOLVED | PLAYING | ACTIVATION CABLE | HARDWARE |

MESSAGE

BLINKING ACTIVATION CABLE — 166

NOTES

BLINKING ACTIVATION CABLE SEEN IN LOGS.
<SERVICE MAN> DEPLOYED TO REPLACE. — 168

SHOWS IMPACTED

Exposure Report

Sales Rep/Provider: <Sales Rep ID>
Client/Category: <Client ID>
Job: <Job ID>
Dates: 11/1/02 to 11/28/02

| Job ID | Job Name | App in Rot | Num Rot | Client/Category | Sales Rep/Provider |
|---|---|---|---|---|---|
| 1373 | <Job ID> | 3 | 1 | <Client ID> | <Sales Rep ID> |

| Show ID | Show Date | Show Time | Show Miss Reason | Movie | Release |
|---|---|---|---|---|---|
| 150238 | 11/3/02 | 11:03 AM | short show due to: not activated | (Unknown) | 1/1/00 |

Screen: Cinema 1  Site: <Site ID>  Exhibitor: <Exhibitor ID>

App. Start 11/3/02 11:01:36 AM    App. Stop 11/3/02 11:01:48 AM

| Impres. | Missed Impres. | Cost | Admis. |
|---|---|---|---|
| 0 | 0 | $.00 | 0 |

<data removed>

| Show ID | Show Date | Show Time | Show Miss Reason | Movie | Release |
|---|---|---|---|---|---|
| 163434 | 11/28/02 | 11:04 AM | short show due to: not activated | (Unknown) | 1/1/00 |

Screen: Cinema 7  Site: <Site ID>  Exhibitor: <Exhibitor ID>

App. Start 11/28/02 11:01:42 AM    App. Stop 11/28/02 11:01:52 AM

| Impres. | Missed Impres. | Cost | Admis. |
|---|---|---|---|
| 0 | 0 | $.00 | 0 |

| Schedulings | Inc. Sched. | Exh. Inc. Sched. | HW Inc. Sched. | SW Inc. Sched. | Con. Inc. Sched. | Bugs Inc. Sched. | Unk. Inc. Sched. | Impres. | Missed Impres. | Cost |
|---|---|---|---|---|---|---|---|---|---|---|
| 56 | 56 | 55 | 0 | 0 | 0 | 0 | 1 | 0 | 0 | $.00 |

Admis. 0

| | | |
|---|---|---|
| 2002-12-23 15:00:00 | PROJECTOR OFF, NO ERROR/WARNING |
| 2002-12-23 15:01:00 | PROJECTOR OFF, NO ERROR/WARNING |
| 2002-12-23 15:01:31 | PROJECTOR ON, NO ERROR/WARNING |
| 2002-12-23 15:02:00 | PROJECTOR ON, NO ERROR/WARNING |
| 2002-12-23 15:03:00 | PROJECTOR ON, NO ERROR/WARNING |

FIG. 13

SYSTEM AND METHOD FOR REMOTELY MONITORING, DIAGNOSING, INTERVENING WITH AND REPORTING PROBLEMS WITH CINEMATIC EQUIPMENT

PRIORITY

The present application claims priority to U.S. Provisional Application Ser. No. 60/435,164 filed Dec. 20, 2002.

BACKGROUND

The invention generally relates to theatres and cinemas, and relates in particular to networks of theatres and cinemas. Operational practices may vary among theatre and cinema networks and vary from screen to screen as well as vary at different times of a day, week, month or year depending on the individuals operating the equipment. As a result, inconsistencies or problems may arise. For example, start times of movies may vary (due to crowds, weather or operational difficulties), volume levels may be changed, and equipment may be inadvertently left on.

Equipment that is directly involved with movie presentation is generally monitored and maintained since moviegoer audiences may complain if it is not. Ancillary equipment, however, is often overlooked. As an example, pre-show advertising may be delivered by slide projectors, which are often forgotten or ignored. Routine spot checks by the screen advertising industry indicate that slide projectors have a delivery failure rate of over 10%.

The in-theater advertising industry depends upon statements from theaters as the sole means by which successful delivery of theater advertising is determined. Statements are generated on a periodic basis (e.g., weekly) for the purpose of reporting the successful delivery of advertising content to the theatre's patronage. Statements are sworn written statements affirming successful presentation of the movie pre-shows for a particular period of time and the patronage for that period. Typically, statements are authored by a theater manager who does not always have a first-hand account of the delivery of each movie pre-show included in the time period of the affidavit. Unfortunately, use of statements may be subject to errors and omissions. Statements often reflect 0% delivery failures, which is typically not consistent with the failure rate observed through routine spot checks.

In general, the theater manager may not become aware of a failure in non-movie-related equipment for many hours and often even days. Once aware of the failure, the manager has no knowledge of the length of time the pre-show equipment has been in the state of failure. Furthermore, once the manager is aware of the failure, reporting that failure to be fixed by the screen advertising company remains a lower priority than general operations of presenting movies and selling concessions. Failures do not always involve equipment breakdowns. Equipment may simply be disabled for special events or other reasons and simply not re-enabled.

Lack of attention to non-movie-related equipment results in extended downtime.

Lack of awareness regarding non-movie-related equipment failures results in errors and omission to the statements. Actual movie start-times may vary from the schedule, which can lead to moviegoer irritation. Equipment is not always left in the proper state, which may lead to excessive wear and power consumption.

There is a need, therefore, for a system and method for monitoring, diagnosing and even intervening with and reporting problems with theatre and cinematic equipment.

SUMMARY OF THE ILLUSTRATED EMBODIMENTS

The invention provides a system for communicating with, and receiving data representative of equipment state and status from, movie theatre equipment in theatres. In accordance with an embodiment, the system includes a central computer storage unit for receiving and storing data representative of equipment state and status, and a plurality of remote computer storage units coupled to the central computer storage unit for transmitting data representative of equipment state and status. Each of the plurality of remote computer storage units includes a first remote computer storage unit coupled to at least one theatre automation unit for detecting and transmitting data representative of automation equipment state and status. The first remote computer storage unit is also coupled to at least one theatre projection unit for detecting and transmitting data representative of projection equipment state and status. The first remote computer storage unit is also coupled to at least one theatre audio processing unit for detecting and transmitting data representative of audio equipment state and status. The first remote computer storage unit is also coupled to at least one theatre power source for detecting and transmitting data representative of power state and status.

BRIEF DESCRIPTION OF THE ILLUSTRATED EMBODIMENTS

The following description may be further understood with reference to the accompanying drawings in which:

FIG. 9 shows an illustrative diagrammatic view of a job scheduling report table in accordance with an embodiment of the invention;

FIG. 10 shows an illustrative diagrammatic view of a supporting data table for use with the table of FIG. 9 in accordance with an embodiment of the invention;

FIG. 11 shows an illustrative diagrammatic view of an event report table in accordance with an embodiment of the invention;

FIG. 12 shows an illustrative diagrammatic view of an exposure report in accordance with an embodiment of the invention;

FIG. 13 shows an illustrative diagrammatic view of an event data stream table in accordance with an embodiment of the invention;

Figure 1:
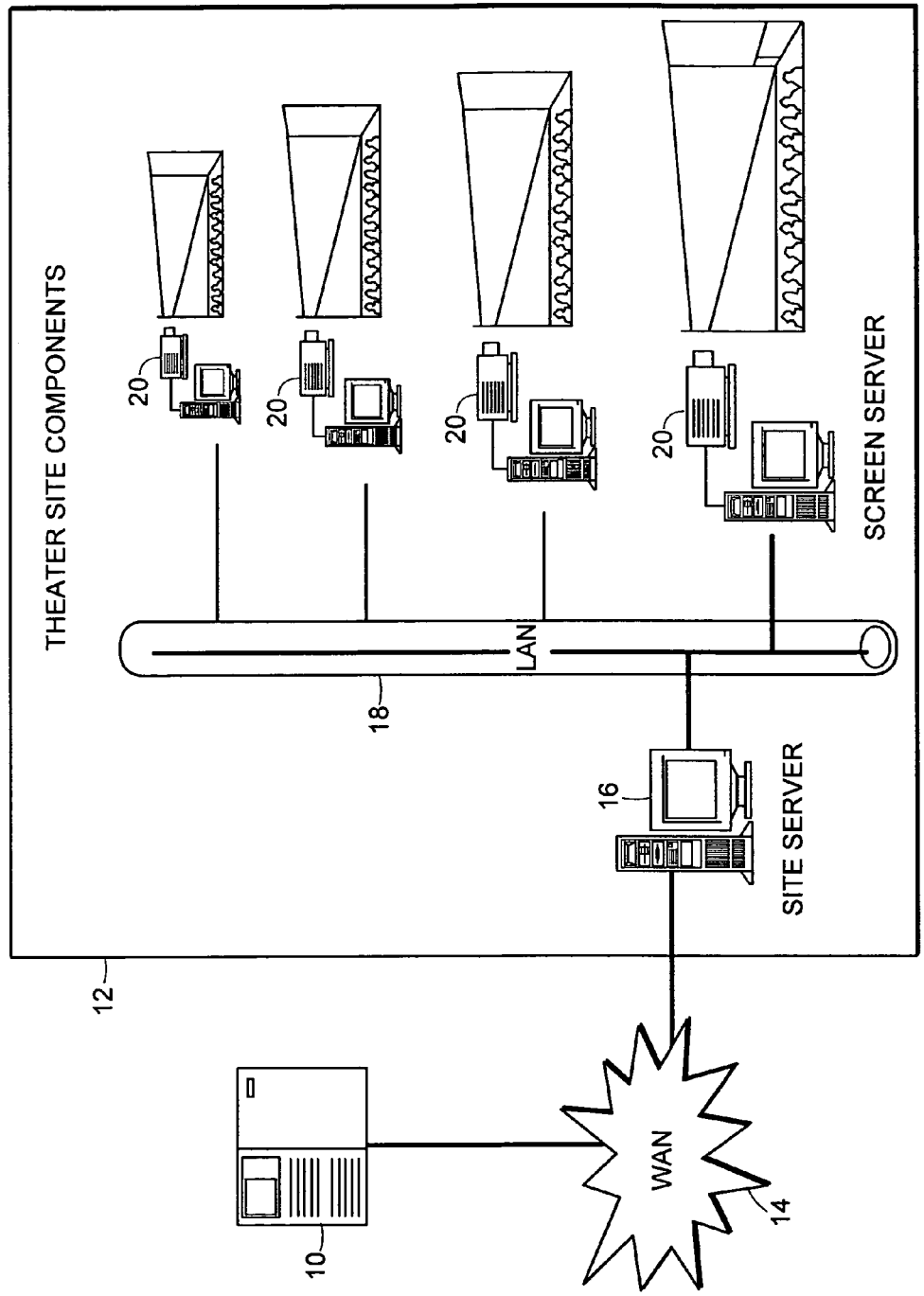
FIG. 1 shows an illustrative diagrammatic view of a system in accordance with an embodiment of the invention.

The drawings are shown for illustrative purposes only and are not to scale.

DETAILED DESCRIPTION OF THE ILLUSTRATED EMBODIMENTS

In accordance with various embodiments, the invention provides a computer-based system for monitoring the state and status of a network of geographically dispersed in-theater equipment. State and status data are collected and used in real-time or near real-time to alert operators of failures and to cause the dispatch of maintenance personnel to effect system repairs. Such failures as well as system restoration are recorded as system incidents. System incidents, in turn, are recorded in reports complete with fault assignment and operational down-time. Fault is the basis for compensation in the form of make-good and/or rebate. In the case of equipment breakdowns, these records may also serve as a basis for component performance metrics and benchmarking.

A goal of certain embodiments of the present invention is to maximize system availability by quickly identifying and reporting system failures thereby decreasing response and repair time, in turn, increasing system availability. The process begins when: (a) system components report specific error conditions to their respective host computers; (b) host computers lose contact with system components; or (c) host computers detect disruptive environmental conditions such as loss of power. This state and status data is relayed back to a central computer that, in turn, automatically alerts a system operator, a field maintenance provider, or in-theater staff person, thus initiating the process of system restoration. Earlier detection and intervention will result in higher system availability.

A further goal of certain embodiments of the present invention is to record and report the cause and fault of an incident as a basis for compensation. State and status data is the foundation for incident records that are further detailed by operators and/or field maintenance personnel. An important attribute of an incident is its fault classification, which is either implicit in the data or explicitly assigned by operators. Parties directly associated with system operations may then be held accountable for downtime. Compensation may be calculated directly from the lost opportunity on a lost time, lost CPM, or other basis.

A further goal of certain embodiments of the present invention is to record and report statistical performance metrics by theater for the purpose of identifying best practices as well as identifying potential theater-specific environmental threats. Each theater has the potential for maintaining smooth operations conducive to high availability. Poor operational practices or environmental issues may reduce availability. By comparing practices and environmental issues at high-availability theaters to those at low-availability theaters, best practices and best environmental conditions may be identified. Best practices and environmental conditions may then be adopted by otherwise low-availability theaters, thereby improving availability of the overall system.

A further goal of certain embodiments of the present invention is to record and report statistical performance metrics by hardware components for the purpose of identifying best-of-breed. Components from varying manufacturers will result in varying degrees of system availability. By identifying those models of component yielding the highest availability, the system may be scaled (extended) with best-of-breed components thus increasing overall system availability.

A further goal of certain embodiments of the present invention is to record and report statistical performance metrics by installation team for the purpose of identifying best equipment installation practices. Each installation team may bring individual skills and knowledge to bear on system installation. Some practices may result in higher availability, reduced time/cost per install and reduced maintenance. By identifying those practices that yield the highest availability and the lowest costs, the system may be scaled (extended) with best installation practices.

A further goal of certain embodiments of the present invention is to record and report statistical performance metrics by maintenance team for the purpose of identifying best maintenance practices. Each maintenance team will bring individual skills and knowledge to bear on system maintenance. Some practices may result in higher availability, reduced time-to-fix/cost and reduced repeat visits per incident. By identifying those practices that yield the highest availability and the lowest costs, the system may be maintained with best maintenance practices.

A further goal of certain embodiments of the present invention is to automatically attempt to self-correct certain types of failures. This includes, but is not limited to, automatically resetting equipment. In the case of a failure such as loss of network connectivity, the system may allow some time for communications to resume. In the event that communications do not resume within a pre-established period of time, the system may reset itself in an attempt to re-establish communications. This technique is not limited to internal system components, but may be employed with other devices connected to the system. Rapid, automated, self-correction techniques reduce time-to-fix, which increases system availability. Self-correction techniques also reduce cost-to-fix by eliminating labor.

A further goal of certain embodiments of the present invention is to serve as a platform for recording and reporting data for other in-theater devices including, but not limited to traditional 35 mm film projectors, digital movie projectors, digital movie players, audio equipment, and ancillary equipment such as film platters. Such data may be used for real-time failure resolution as well as statistical reports in way similar to the other goals of the present invention.

In accordance with an embodiment, a system of the invention may provide for remotely monitoring the state of movie theatre equipment. The system records status directly and/or records states and state-changes that can often be diagnosed as status. The system alerts operators to errant conditions. Operators can interrogate the database of states, status and incidents for patterns of equipment failures and equipment operational practices. The system facilitates documentation of incidents, which are equipment interventions, repairs or replacements, associated with equipment status data. Operators may correlate the data with movie showing data to reveal lost opportunities to show pre-show advertising. Operators may further correlate the data with attendance to reveal lost opportunities to show pre-show advertising on a per-impression basis. Such lost opportunities, otherwise known as miss-outs, may then be used as a basis for compensation, make-goods or reimbursements.

In accordance with various embodiments, sensors may be used to monitor each attribute of each piece of equipment. Data is collected from each sensor and transferred to a central location that facilitates analysis. A general architecture for such a system may include a computer at each location to log and relay data from the sensor to the central location. Transmission of the data from a set of remote theaters to the central location may involve a WAN (Wide Area Network). A central facility for collection and analysis of the data may include a relational database operating on a central computer. This architecture is highly aligned with an emerging digital screen advertising system. Furthermore, with a typical downtime of 10%, screen advertising is the biggest benefactor of remote monitoring and diagnostics.

Because the remote monitoring application and digital screen advertising application are so highly aligned, an embodiment of the system of the present invention leverages the digital screen advertising system as its hosting platform. The components of the digital screen advertising system may be used as components of a system in accordance with an embodiment of the present invention.

A digital screen advertising system that may be used with certain embodiments of the present invention has a central computer that may be used as a regional server that exchanges data with computers at one or more remote theater complexes 12 via a WAN 14. The WAN may be formed by a variety of technologies, such as satellite or terrestrial data communications. Each remote theatre complex 12 may include a site server 16, a local area network (LAN) 18 and a plurality of screen servers 20. The site server 16 is the receiving computer at each theater complex; among other duties, it serves as a relay, providing a data path between the regional server 10 and screen servers 20. The screen servers 20 serve the content they receive from the regional server 10 onto the movie screen and sound system.

The digital screen advertising system maybe designed to deliver audio and/or video content, particularly advertising content, to movie theater audiences. Such a system may also serve as an infrastructure for receiving system state and status data. Such data may be used for remote diagnostics and performance monitoring. Each component in the system serves a critical function and will be monitored for failure.

Figure 2:
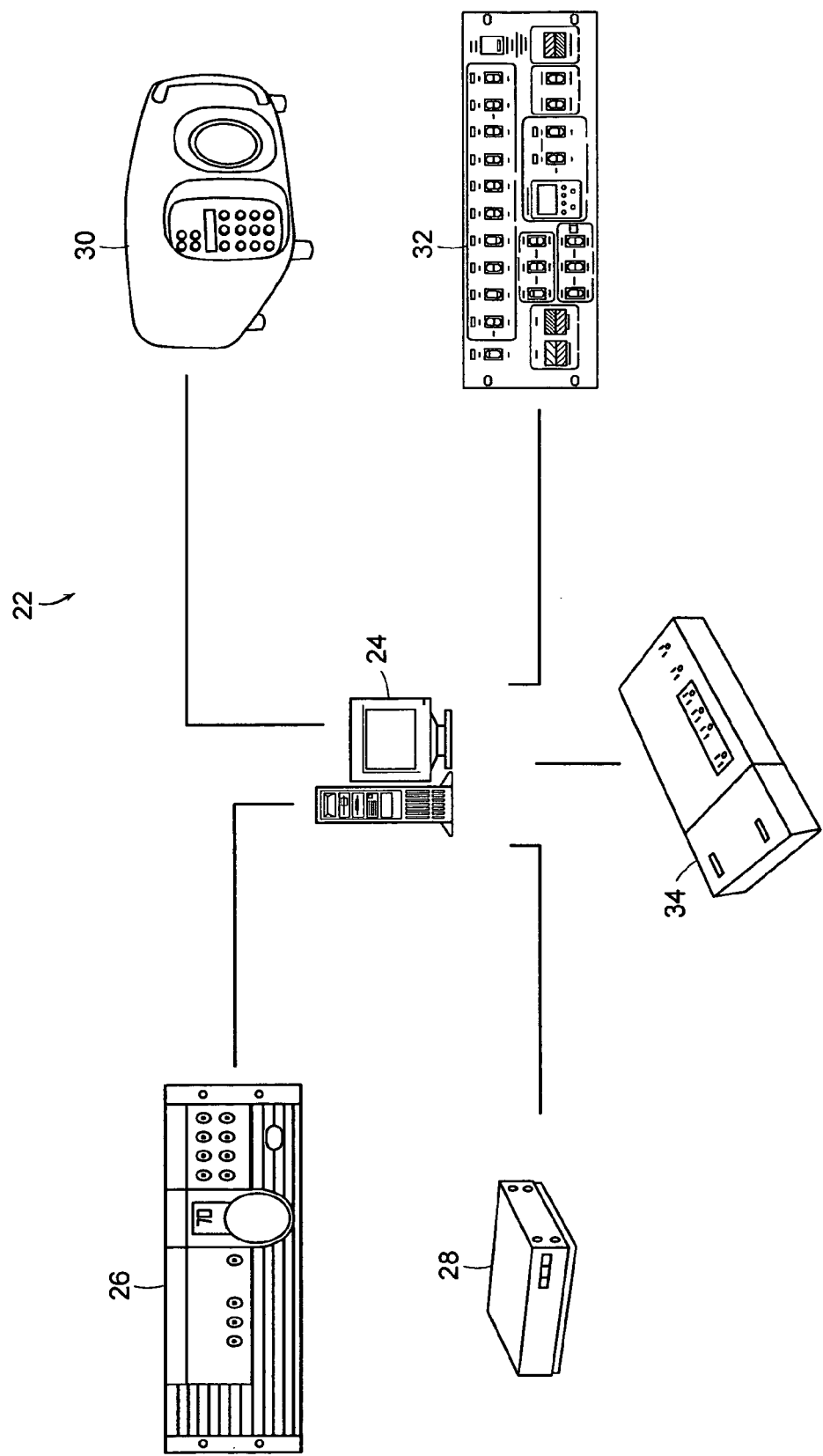
FIG. 2 shows an illustrative diagrammatic view of a server assembly for use in a system in accordance with an embodiment of the invention.

The screen server is connected to the largest array of equipment and is therefore in a position to report the majority of component state and status data. As shown in FIG. 2, a screen server assembly 22 may include a screen server controller 24, an audio processor 26, a network 28 (e.g., a LAN), a digital projector 30, theatre automation equipment 32 and an uninterruptible power supply (UPS) 34. Each component may be monitored through an existing connection, a new connection or an added sensor. All monitored data is subject to being logged, and logs are returned to the regional server and available for generation of an alert and/or statistical and forensic analysis.

The digital projector may be controlled remotely via a serial (RS232) cable or other digital connection. Through this same cable, it may be monitored for state and status information including, but not limited to, current state of operation, projector usage in seconds, lamp usage in seconds, configuration settings, and error conditions. Monitoring may be further enhanced by including a light sensor aimed on-screen to ensure that an image is, in fact, on-screen, that the image is bright enough, perhaps that it is in-focus, on-screen, and coincides with the intended image.

The theater automation provides state information through the use of an interface. One such interface, an activation cable, provides the screen server with information regarding the on/off state of movie projector equipment. An alternate interface provides state and status of curtain position, masking position, and house light level, as well as additional information regarding the movie projector equipment.

Modern audio processors such as the Dolby CP650 sold by Dolby Laboratories, Inc. of San Francisco, Calif. have digital interfaces through which state and status data may be collected. Older audio processors could be equipped with an interface to provide similar data including, but not limited to, power status, input channel selection, audio levels, and error conditions. Monitoring could be further enhanced with one or more microphones in the theater. Such microphones could monitor audio levels and provide in-theater audio to ensure that it coincides with the intended audio.

A UPS such as the Powerware Best Patriot 250 sold by Powerware Corporation of Raleigh, N.C. may be used to continue to provide power to the screen server in the even of power failure. Such a device also provides power status to the screen server, notifying the screen server of power failures and preparing the screen server for possible shutdown when the reserve power in the batteries becomes low. This and similar devices may also report other power issues such as surges and brownout conditions. Power on/off and quality data is basic to equipment operation. Monitoring could be enhanced with one or more additional power sensors, in particular, sensors for detecting reflective harmonics in the power line. Reflective harmonics are high frequency currents often emitted by power supplies and may be harmful to computer electronics. The lamp house of the film projector is equipped with a particularly large power supply.

Network availability is tested by way of the network interface card (NIC) or similar data communications device. Not only can local/internal tests run on the device, but connectivity to other network devices may also be tested. In this way, a screen server not only reports on its own network status, but also reports on the status of other devices on its network.

If the network is down and if the network is not redundant, the screen server will not be able to report its own failure in real-time. One or more proximal screen servers however, which have not lost general connectivity, will report a loss in connectivity with their peer. Furthermore, the screen server with a loss of network connectivity will log the failure to be reported once connectivity is restored. In other embodiments, a redundant network may be employed.

The system of the present invention not only detects, logs and reports error conditions, but also non-error conditions. While the goals of the system are related to error conditions, non-error conditions often provided clues to error conditions as well as verification and auditing of non-error conditions. All data, error-related or not, is returned to the regional server where statistical and forensic analysis may be performed.

The regional server is a larger computer or set of computers with relational database(s), business processes and an operational interface. The regional server stores the logged data in such a way that it is associated with a particular device or set of devices and time. The regional server has an interface that facilitates display of the logged data.

Figure 3:
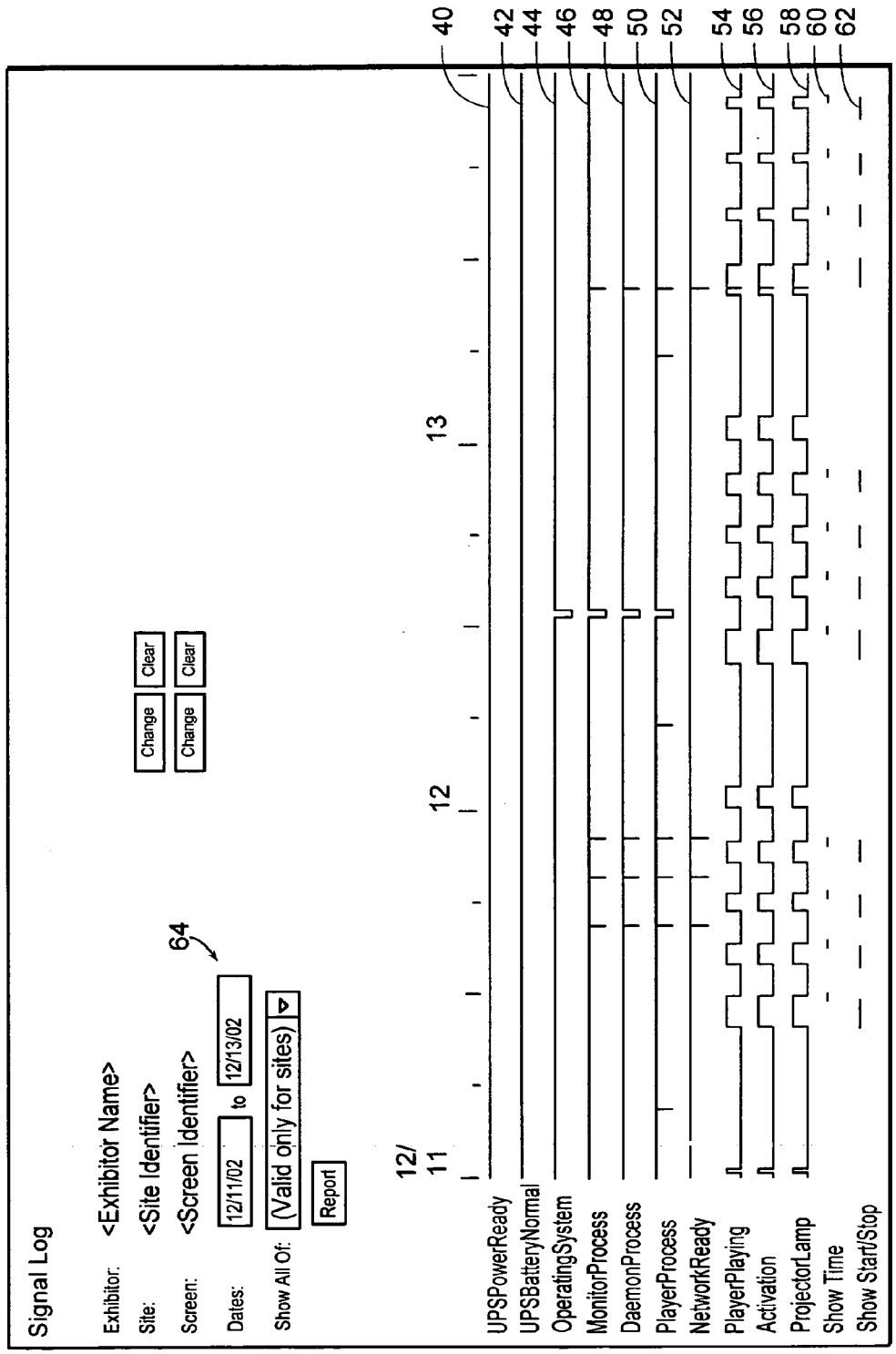
FIGS. 3–5 show illustrative diagrammatic timing charts for a signal logs in accordance with various embodiments of the invention.

In general, errors and non-errors are referred to as signals and signals may be presented linearly according to time as signal log timing charts as shown in FIG. 3. Each of a number of signals may be logged and reviewed by the system operator. In particular, FIG. 3 shows a UPS power restore signal 40, a UPS battery normal signal 42, an operating system signal 44, a monitor process signal 46, a daemon process signal 48, a player process signal 50, a network ready signal 52, a player playing signal 54, an activation signal 56, a projector lamp signal 58, a show time signal 60, and a show start/stop signal 62. The use of a timing chart may be useful in identifying originations of problems and sequences of related failures. Signals are typically two-state, on or off, up or down, activated or not activated, etc. However, a signal could have more than two states. A tri-state signal (e.g., low, medium, high) may be presented graphically through the addition of a third middle level in various embodiments. In further embodiments, the signal could be scalar. Scalar data could be normalized to values from 0 to 371 and represented by corresponding levels from bottom to top. High-resolution data could be abbreviated in this way, but meaningful interpretation might require an alternate or supplemental data presentation form.

Figure 4:
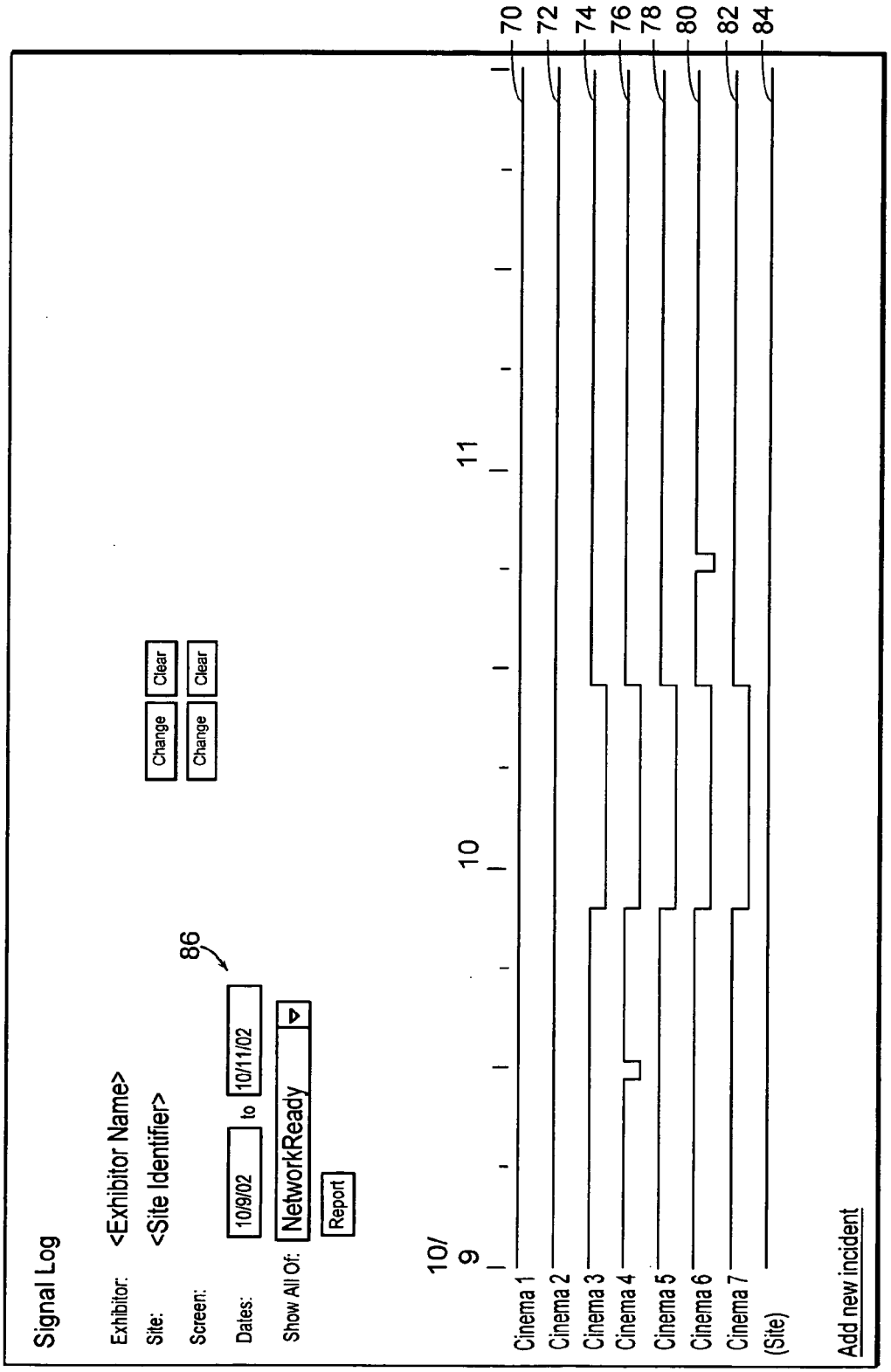

As shown in FIG. 4, a signal log timing chart may be viewed for a plurality of cinemas, each of which provides a cinema signals 70–82 as shown. The log may also include an additional site signal 84. A further signal log timing chart may show an operating system signal 90, a monitor process signal 92, a daemon process signal 94, a network ready 1 signal 96, and a network ready 2 signal 98.

The log signal timing charts illustrate how signals often operate in patterns. It is when the pattern breaks that there is usually an error condition. Signals may be view in any number of ways. FIG. 3 shows multiple signals at a single screen server location over a three day period (Dec. 11, 2002 to Dec. 13, 2002, inclusive) as shown in the date field 64. FIG. 4 shows one signal from each of multiple screen servers within one location for a three day period (Oct. 9, 2002 to Oct. 11, 2002, inclusive) as shown in the date field 86. In alternate embodiments, presentations need not be graphical, but could be textual.

Figure 5:
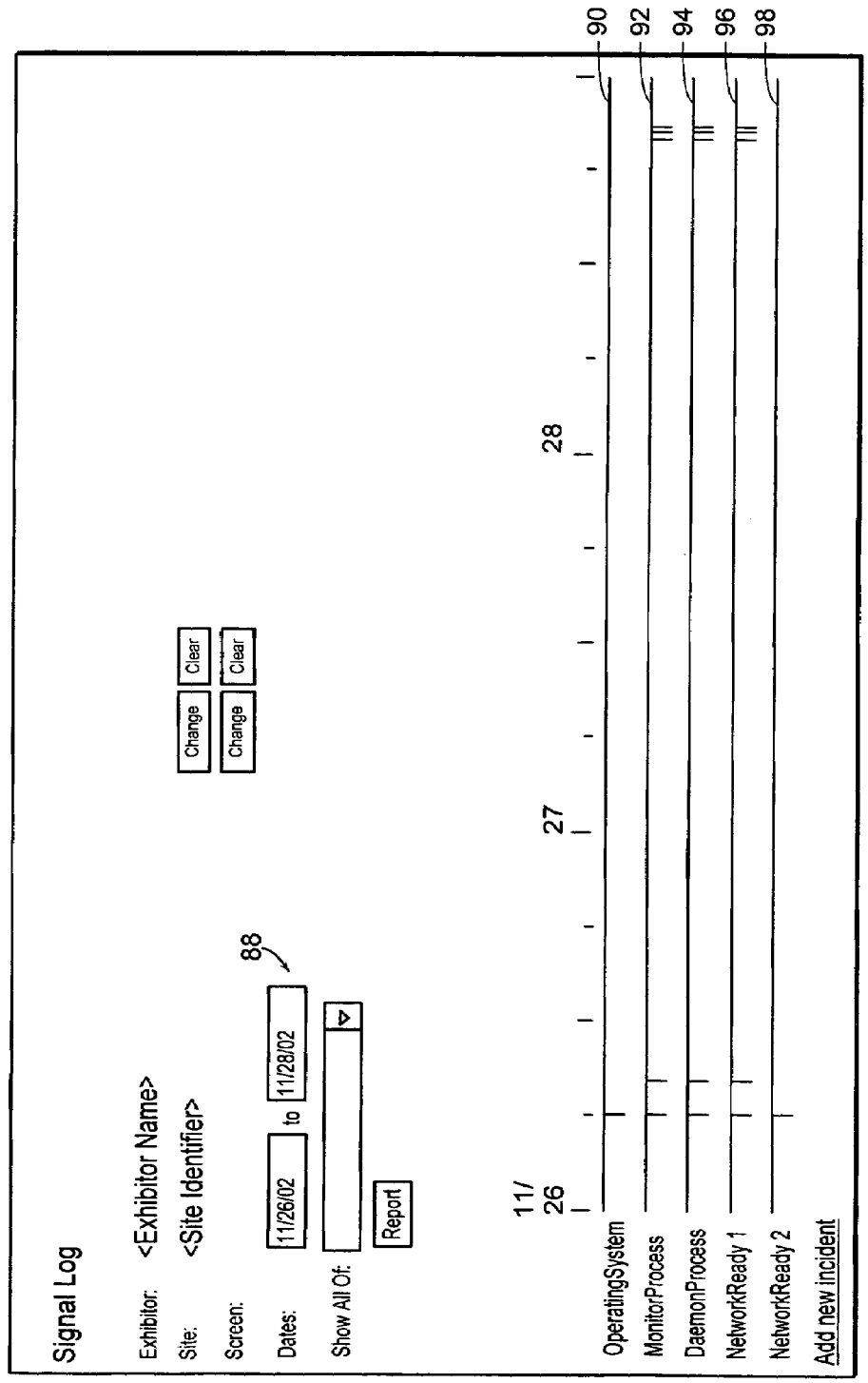

Site servers serve largely as passive relays. As such, a site server is not typically directly connected to any array of equipment as are the screen servers. Nevertheless, a site server performs network connectivity signal reporting on both the local and the wide area networks for example, for a two day period (Nov. 26, 2002 to Nov. 28, 2002, inclusive) as shown in the date field 88 in FIG. 5. Similarly, the Regional Server reports only connectivity to the sites.

Error detection may occur local to the source, at a peer or other network device in the path to the Regional Server, or at the Regional Server. When an error condition is detected at the screen server, a local process will initiate one or more actions including but not limited to (1) recording and reporting the condition to the central regional 3server and (2) attempting to fix the problem automatically.

Error conditions are recorded in log files that are transferred via LAN to the site server then relayed by the site server via WAN to the regional server. The regional server reads and inserts the log data into its database. Along the way to the database, processes analyze the logs and flags undesirable conditions (errors and warnings) as an indication of alert status. Flagged data is displayed on an operator's console for immediate attention. Alternatively or in parallel, the flagged data is transmitted to an alternate device including but not limited to an email inbox, a mobile personal pager, PDA or text-messaging cell phone. An alternate transmission means could incorporate a wireless technology such as WIFI standard device or BLUETOOTH standard device from the site server at the theater to a communication device monitored by theater personnel.

Figure 6:
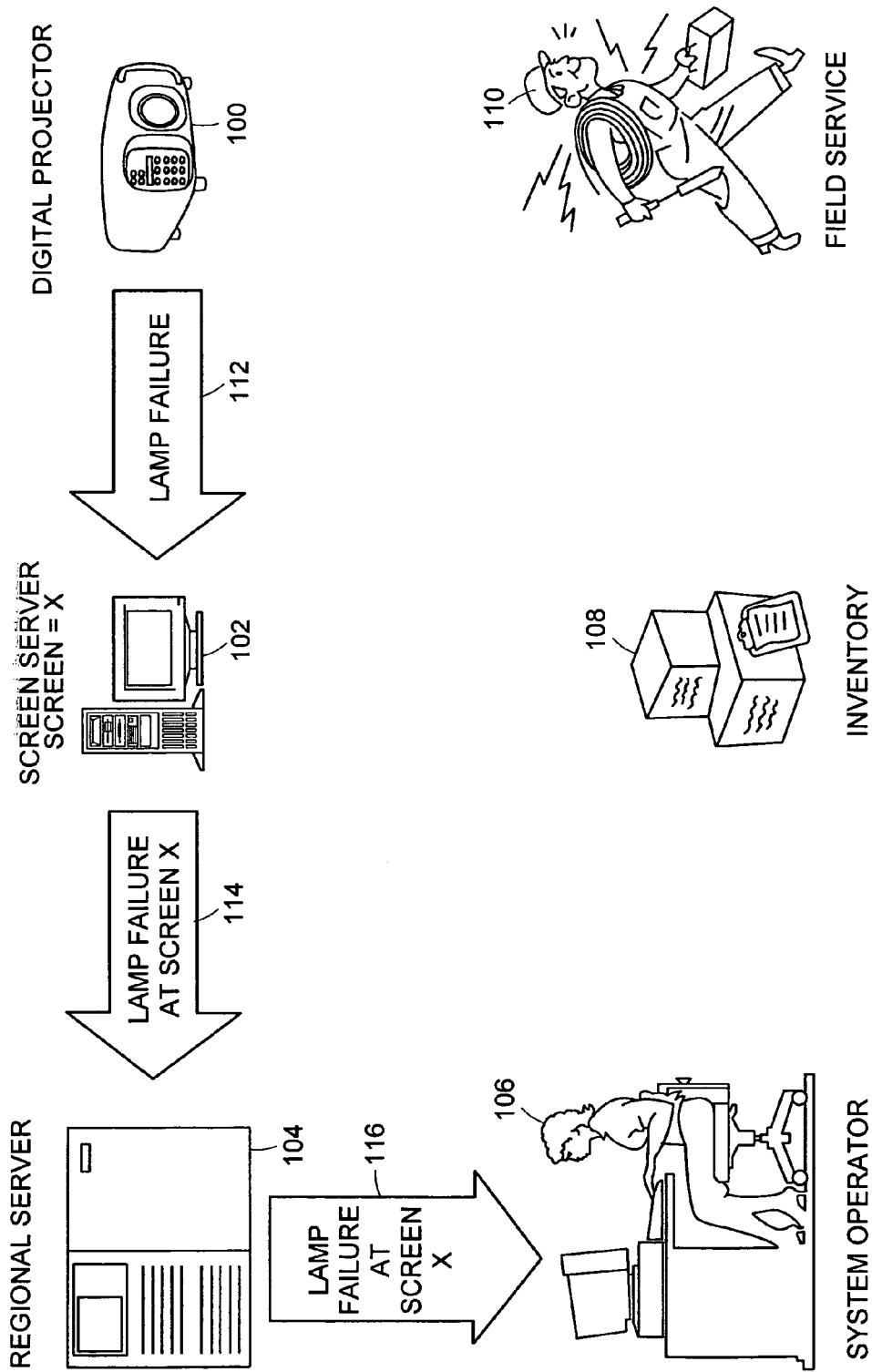
FIGS. 6–8 show illustrative diagrammatic views of operational functional views of operation stages in accordance with various embodiments of the invention.
Figure 7:
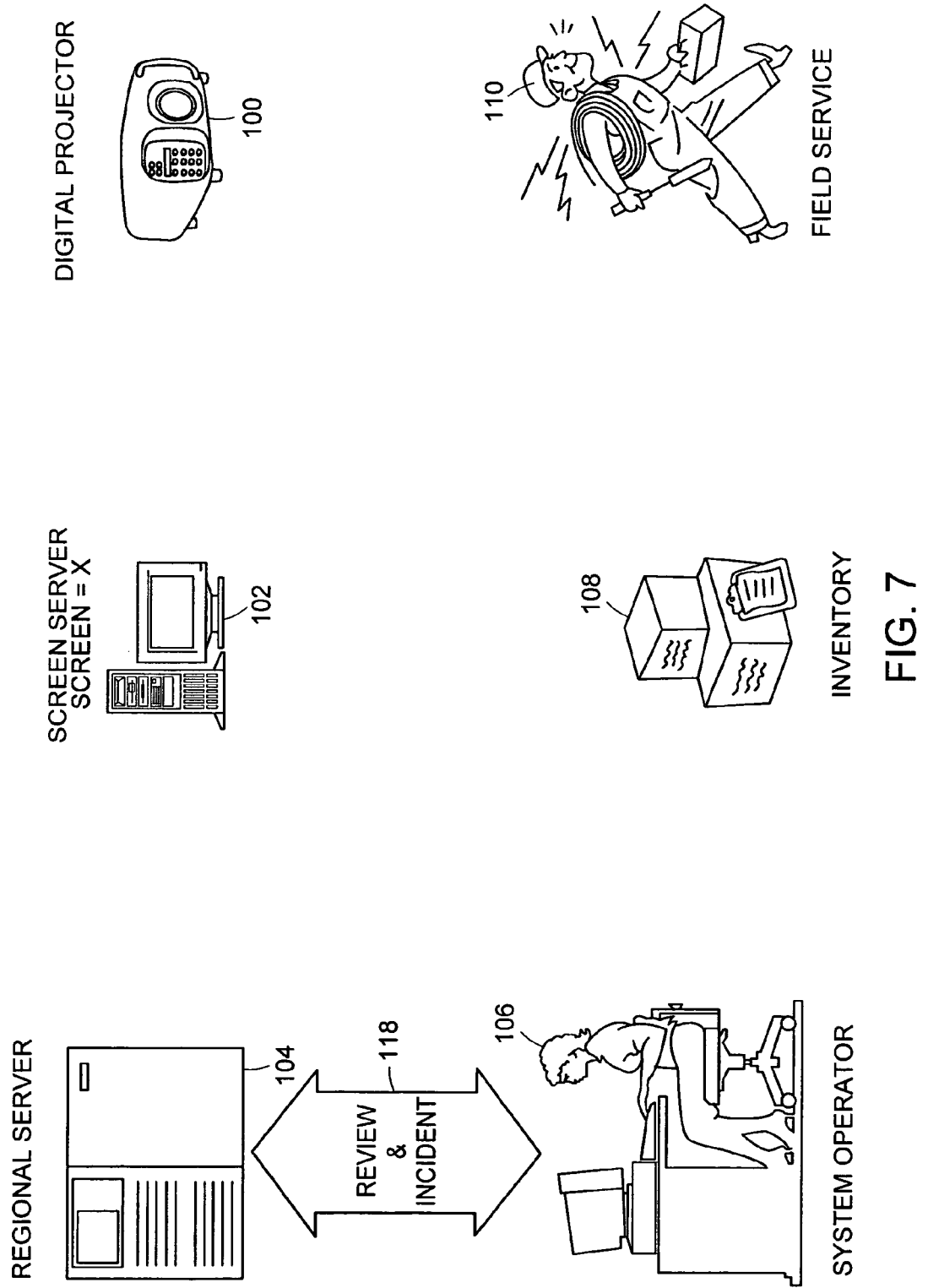
Figure 8:
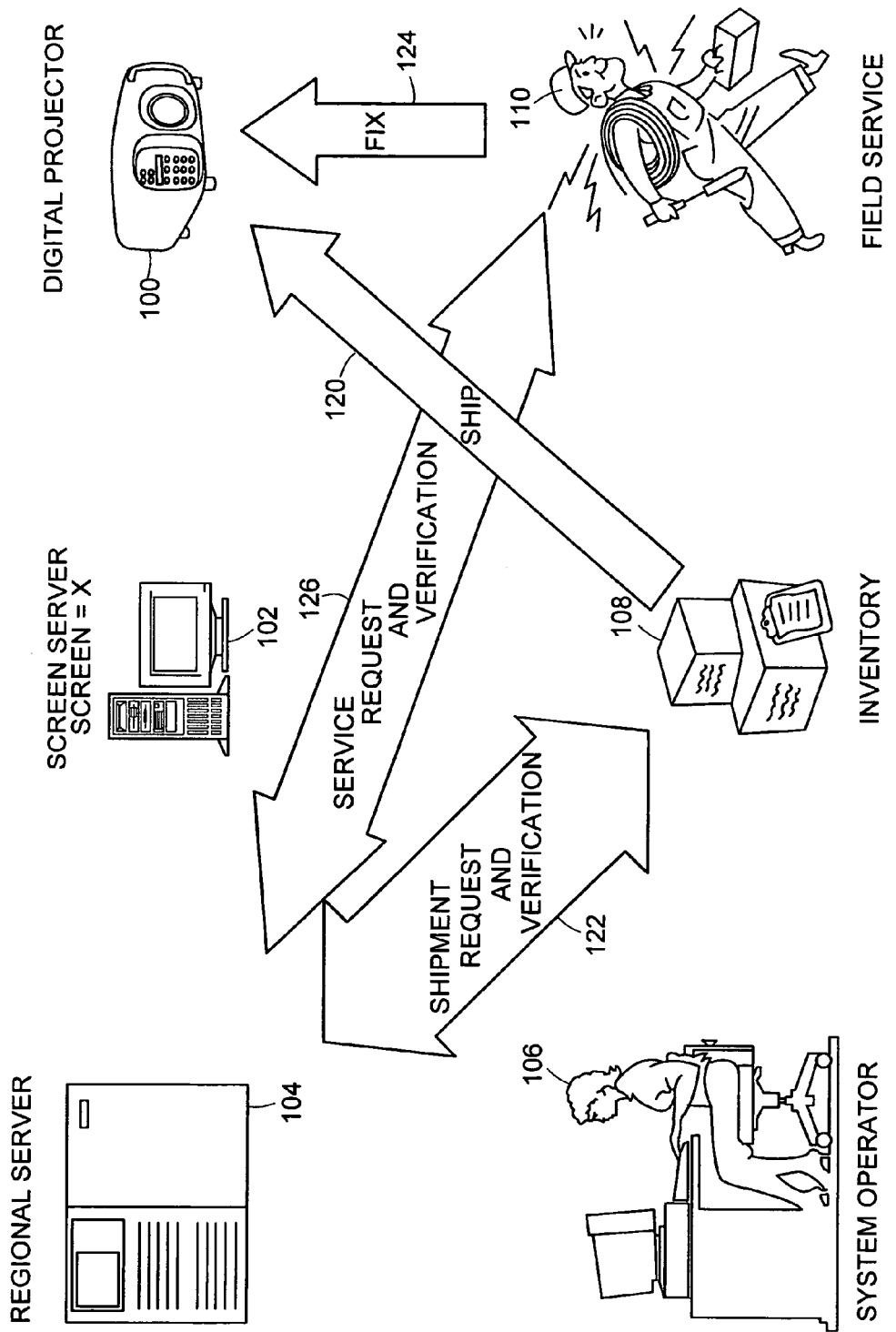

As generally shown in FIGS. 6–8, a system in accordance with an embodiment of the invention may resolve a wide variety of failures. For example, a system in accordance with an embodiment of the invention may include a digital projector 100, a screen server for screen x 102, a regional server 104, a system operator 106, inventory 108 and a field service support unit 110. Certain error conditions may be fixed automatically. Such an error may be caused when a device hangs or otherwise becomes unresponsive. In such cases, the screen server will reset the device as a means of attempting to clear the error. Attempts to restore device functionality are logged and transmitted to the regional server to be recorded. Once in the central error queue, an operator will be alerted. For example and with reference to FIG. 6, during use, a lamp failure signal 112 may be transmitted from the digital projector 100 to the screen x screen server 102. A lamp failure at screen x signal 114 may then be transmitted from the screen x screen server 102 to the regional server 104. A lamp failure at screen x signal 116 may then be transmitted from the regional server 104 to the system operator 106.

An operator is alerted to the error condition through the operator interface or in some other electronic way such as an email sent to a personal digital assistant (PDA), cell phone or paging device. The operator will review the error condition and may review logged events before and after the error condition started. The operator may also contact the theater and request additional information. Once the operator has affirmed the error condition, he or she will create an incident record. The incident record will be associated with the error condition data through period of time and location identifier. As shown in FIG. 7, reviewing and incident reporting signals 118 may pass between the operator 106 and the regional server 104.

The operator may then initiate a service call. Additionally, the operator may also initiate shipment of component(s). As shown in FIG. 8, a shipment of one or more components (e.g., a new lamp) may be made as shown at 120 following verification with the regional server 104 as shown at 122. Field service personnel may then be dispatched to go to the digital projector as screen x 100 as shown at 124 following verification with the regional server 104 as shown at 126. The email order identifies the required component, ship-to address and ship method. Enhancements facilitate a shipping label to be automatically printed and affixed to the order as well as a return shipping label for cases in which equipment should be sent back to the manufacturer or to a depot for evaluation and/or repair.

All communications are captured in the system. Anywhere possible, communications are electronic. For example, the operator's initiation of the field service call is facilitated through interaction with the operator's interface. The system then sends the service request electronically. This process has three major benefits: (1) the message is accurate and complete; (2) automation reduces labor cost; (3) transmission of the message is recorded and time-stamped within the system, thus making the incident fully auditable.

Receipt of the message is acknowledged by the field service provider and/or by the inventory shipping facility through a similar and automated process. This can be facilitated in a number of ways. First, email messages can be sent return receipt requested, which would cause automatic acknowledgement. In the case of field support using a PDA, pager, or cell phone, receipt can be acknowledged manually through two-way messaging using keywords that can be read automatically by the system or through a web interface, mobile (PDA, cell) or otherwise. All acknowledgements are recorded, time-stamped, and indexed with the appropriate incident record by the Regional Server when received.

The process is complete when the field service provider notifies the system operator that the error condition has been fixed. The operator documents any necessary final notes then closes the incident.

Some incidents need not be initiated by an operator, but can be initiated automatically. When a bulb fails, no investigation is necessary. The system can automatically initiate creation of an incident and request shipment of a bulb. Receipt of the new bulb may not be acknowledged, but restored operation of the projector implies resolution of the incident and the record is automatically closed.

Reports are typically generated for one of two reasons, accounting or performance review. Assuming that not every show will be successfully delivered, the question becomes one of monitoring the magnitude of loss, overall and by contributing party. Parties involved with the system will each account for some lost opportunities to show content. This includes, but is not limited to, the exhibitor theater staff, installation crew, maintenance crew, software development and operations, hardware manufacturer, and content provider.

The job scheduling report (JSR) is the top-level accounting report. Each job scheduling is a convergence of a job and a pre-show opportunity. As shown in FIG. 9, a job scheduling report may include a category of complete instances as shown at 130, and a category of incomplete instances as shown at 132. Instances are complete when the job was presented at the scheduled pre-show opportunity. Instances are incomplete when the job was not presented at the scheduled pre-show opportunity. The job scheduling report also includes a category named incomplete breakdown as shown at 134 that includes exhibitor data, hardware data, software data, content data, bugs data, installation data, maintenance data and unknown data. The incomplete breakdown category 134 is a categorization of incomplete schedulings by fault category. Fault category is indicated explicitly by an incident or implicitly by system state. The JSR lists schedulings as an actual number as well as a percentage. In this way, the system of the present embodiment contributes data to the screen advertising system in an integrated way and significant areas for compensation and/or improvement become apparent to the viewer.

While the JSR displays success and loss on a per job/show basis, not all shows are considered equal. The more patrons in the show, the more valuable the show is considered to be. This is because the goal of the advertising job is to reach as many patrons as possible and some shows have more patrons than others. Each instance of an advertising job that is presented to a patron is considered to be an impression. Impressions are measured in units of one thousand (1,000), the cost of which is referred to a cost per thousand (CPT). With the box-office ticket sales data, this report may also be adjusted for number of patrons. In this way, lost opportunities may be displayed on an impression basis and make-goods or reimbursements may be analyzed on a CPM basis.

Each actual value in the JSR is hyperlinked to its supporting data. For example, FIG. 10 shows supporting data for a plurality of shows (as shown at 140) that have had errors. The reason for the error is shown at 142 and the table provides the breakdown data for the incomplete breakdown 134 shown in FIG. 9 for each of the shows 140. Supporting data is the list of incidents or error condition responsible for the missed pre-show opportunities within each cell of the table. Each incident can be responsible for 0 or more job scheduling failures.

Each incident or error condition can, in turn, be browsed to reveal specifics of the event in an event report table as shown in FIG. 11. Each event is identified by a site 150, screen 152, a start date 154 and a duration 156. Each incident is typically assigned a fault classification. In this way, missed schedulings for a particular incident contribute to the statistics in the JSR. The event report table also identifies whether the event was resolved 158, the impact 160, the component 162 and the fault class 164. Messages 166 and notes 168 are also provided as well as an identification of the shows that were impacted 170.

Incidents and incident management are a means by which management may reduce lost opportunities to display pre-show content. It is, however, the content that is the revenue generator. Therefore, reports must also reveal lost opportunities on the basis of an individual piece of content (job). The advertiser cares little about the number of scheduling opportunities lost at a site; however, the advertiser most definitely cares about the successes and losses related only to their job(s).

Integrating job scheduling data with the exposure reports of the digital advertising system facilitates reports detailing lost opportunities. FIG. 12 shows an exposure report for a particular job 180 assigned to a client. The report includes the show 182, the show date 184, the show time 186, the show miss reason 188, the movie 190 and the release 192. In the case where a job was sold based on a flight of showings, this report becomes the accounting basis for a make-good.

The processes of the system of the present embodiment perform the following tasks: detection, logging, transfer, indexing, interpreting, alerting, auto-correction, and reporting. Detection is the process of sensing the current state, status, condition, or activity of a device. Logging is the process of storing the status along with time/date, location, device ID. Transfer is the process of moving the log data to the central server, typically by way of the Site Server. Indexing is the process of recording the data into a database according to time/date, location, and device ID. Interpreting is the process of comparing the data to conditions known to be errors. The process of alerting is to construct an electronic message to be read by a person. The process of auto-correction attempts to reset equipment if possible. The process of reporting is the presentation of data organized for statistical analysis or forensic study.

The system of the present embodiment collects and logs errors as well as polls for state and status at regular intervals. This collection and logging is performed at the Screen Server or equivalent. Each monitored device is connected in some form or fashion to the Screen Server or its equivalent. Monitored components include, but are not limited to, the digital projector, theater automation, uninterruptible power supplies, and network.

The digital projector is connected to the screen server in two ways, the first is the video cable which provides the projector with the video signal to be rendered onto the screen. The second connection is a serial control cable. Through this cable, the screen server is able to turn the digital projector on and off at appropriate times. It is also through this cable that the digital projector provides state and status information.

State and status of the projector include, but are not limited to, 3on or off and with-error-condition, with-warning-condition, fully-operational. Error conditions include, but are not limited to, lamp failure and critically high operating temperature. Warning conditions include, but are not limited to, lamp age and excessive temperature.

State and status data is recorded during normal state change activities such as starting and stopping the pre-show, is recorded at the time of unexpected state change events such as loss of power and is recorded at regular intervals such as every 60 seconds.

State and status data is logged as an event stream with time stamps for each event. Log data may not always be in human readable format and is rarely isolated to the status of just one device. For illustrative purposes, however, FIG. 13 shows what an event data stream may look like, with date 194, time 196 and messages 198 listed in a streaming fashion.

Figure 14:
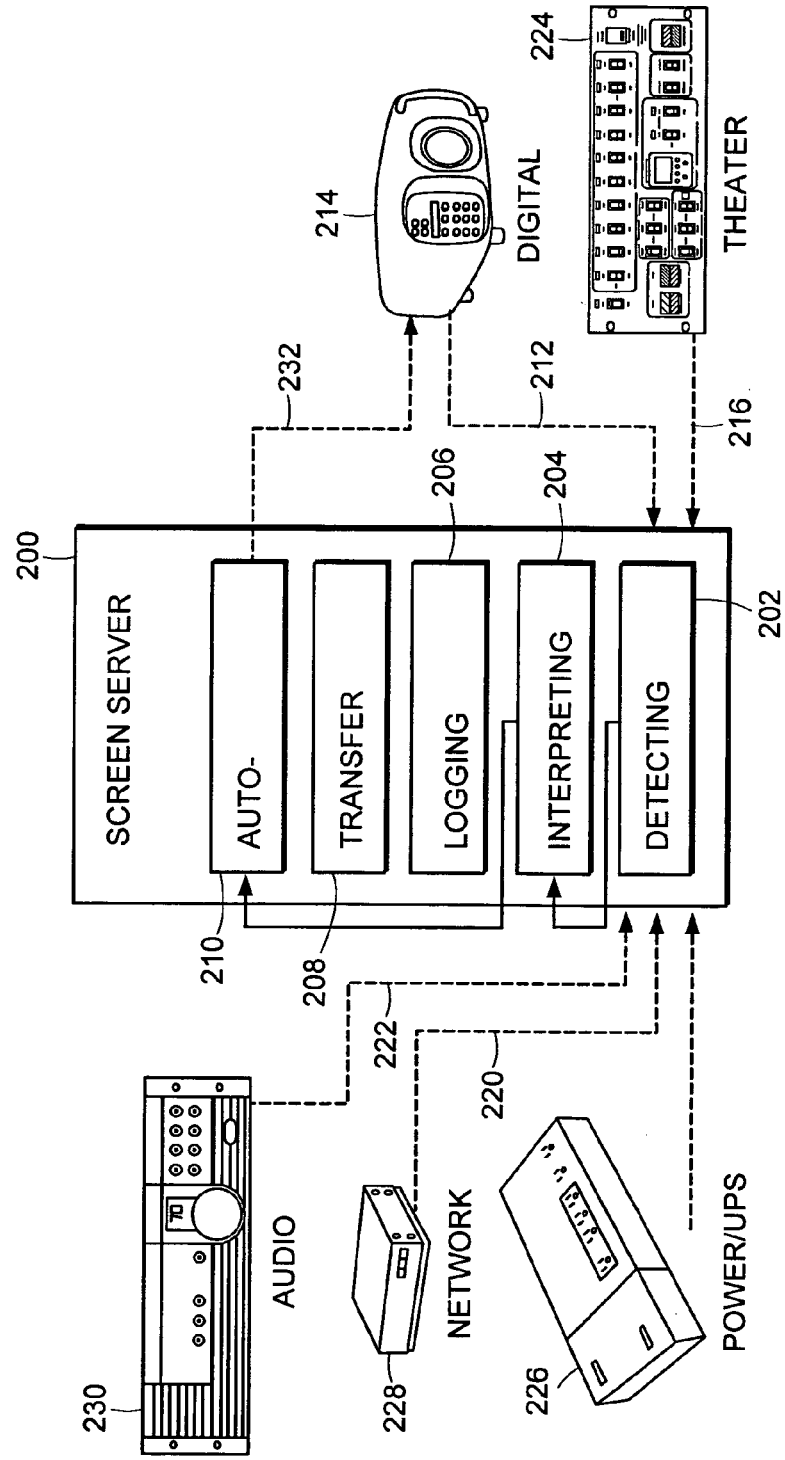
FIG. 14 shows an illustrative diagrammatic view of data flow during detection, interpretation and auto-correction steps in a system in accordance with an embodiment of the invention.

During use, a screen server 200 may perform detecting 202, interpreting 204, logging 26, transfer 208 and auto-correction 210 as shown in FIG. 14. The screen server 200 receives an input signal 212 from a digital projector 214, and also receives input signals 216, 218, 220 and 222 from theatre automation equipment 224, a power supply or UPS 226, a network interface 228 and an audio processor 230 respectively as shown in FIG. 14. The signal 212 from the digital projector 214 indicates that the signal is undesirable. All the signals are interpreted, and the signal 212 generates an auto-correction. Auto-correction will attempt to reset the device or otherwise clear the undesirable condition. As shown in FIG. 14, the auto-correction system is attempting to correct the undesirable condition by sending a reset signal 232 to the digital projector 214.

Another example of an error could be a loss in network connectivity. If the network is down for more than a pre-specified tolerance of time, the auto-correction process may attempt to reset the network interface card (NIC) by rebooting the host computer. The auto-correction process may try to reset the host computer periodically, perhaps once per day, until connectivity is re-established.

If, in the last example, the NIC has stopped working, signals from the effected screen server would never reach the regional server. The condition however, will be recognized by one of the peer computers. Once a computer looses contact with a peer, it will log and transfer the status data back to the regional server, which will interpret the data and issue an alert.

The theater automation is connected to the screen server or its equivalent by means of an activation cable. The activation cable is packaged as a 110 volt AC plug connected via digital cable to a game port connector (DB 15). Inside the 110 volt AC plug is a circuit which when energized by 110 volt AC closes contacts. The contact closure can be read by the screen server or its equivalent as a game port button one down event. In this way, the screen server can detect power to the activation cable. The activation cable is plugged into a 110 volt AC outlet which is controlled by the automation. When the automation detects that the feature film projector has shut down, it energizes this 110 volt AC outlet. When the automation is triggered to begin the start of the movie, it de-energizes this 110 volt AC outlet at the same time 37that it turns the feature film projector on. By monitoring the game port button one, the screen server can not only control the state of pre-show, but also monitor the state of the auditorium. The automation data is logged in a way similar to the digital projector data.

The next generation of digital automation interface (DAI) provides much greater state monitoring. The digital automation interface is a circuit that controls and monitors many aspects of the state of automation including, but not limited to, screen masking position, house light level, and fire alarm status. The screen server or its equivalent will collect this data as a means of increasing the scope of in-theater equipment monitored.

The network is monitored primarily through attempted to communicate with other network devices. The UPS is monitored for power and battery status. Each of these devices can be listened to or polled for state and status data. Like the digital projector and the DAI, data is time-stamped and logged in a file.

The audio equipment is not currently monitored, but could be monitored using a similar mechanism. Interesting data would include input, output, and volume settings as well as other configuration settings. Like the other monitored devices, data would be collected, time-stamped and logged.

In the case lamp failure, the alert process will tolerate several instances of failure in a row, recognizing that the screen server will continue to try to ignite the lamp. When the logs indicate that the lamp did not ignite after several attempts, the lamp is assumed to be in failure and the alerting process generates an alert.

In the case of the excessive activations, the alerting process will again tolerate one or more isolated instances of deactivation and reactivation as noise. However, when a threshold number of cycles is reached within a short period of time, the alerting process will interpret this as an implicit error condition and generate an alert.

Figure 15:
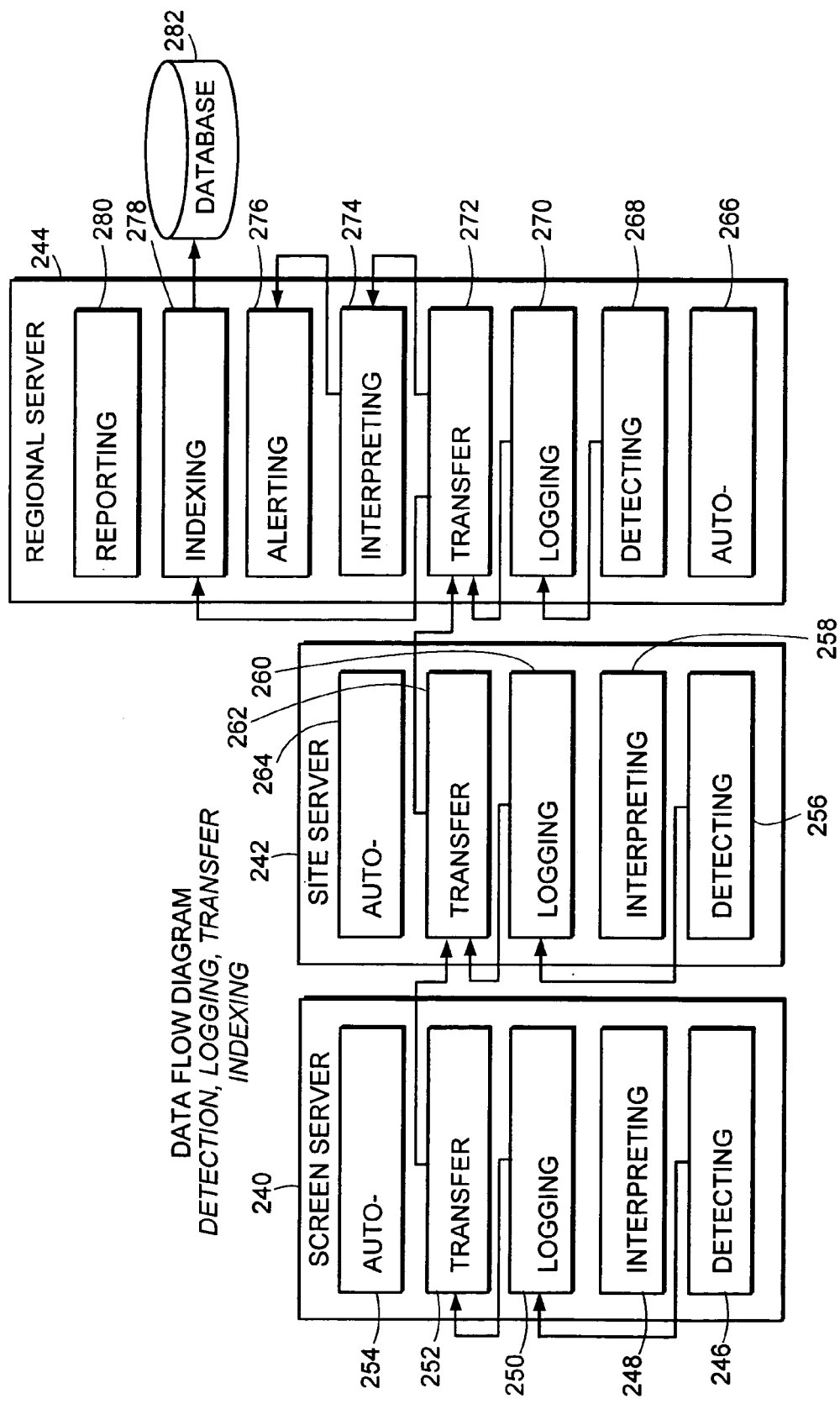
FIG. 15 shows an illustrative diagrammatic view of data flow during detection, logging, transfer and indexing steps in a system in accordance with an embodiment of the invention.
Figure 16:
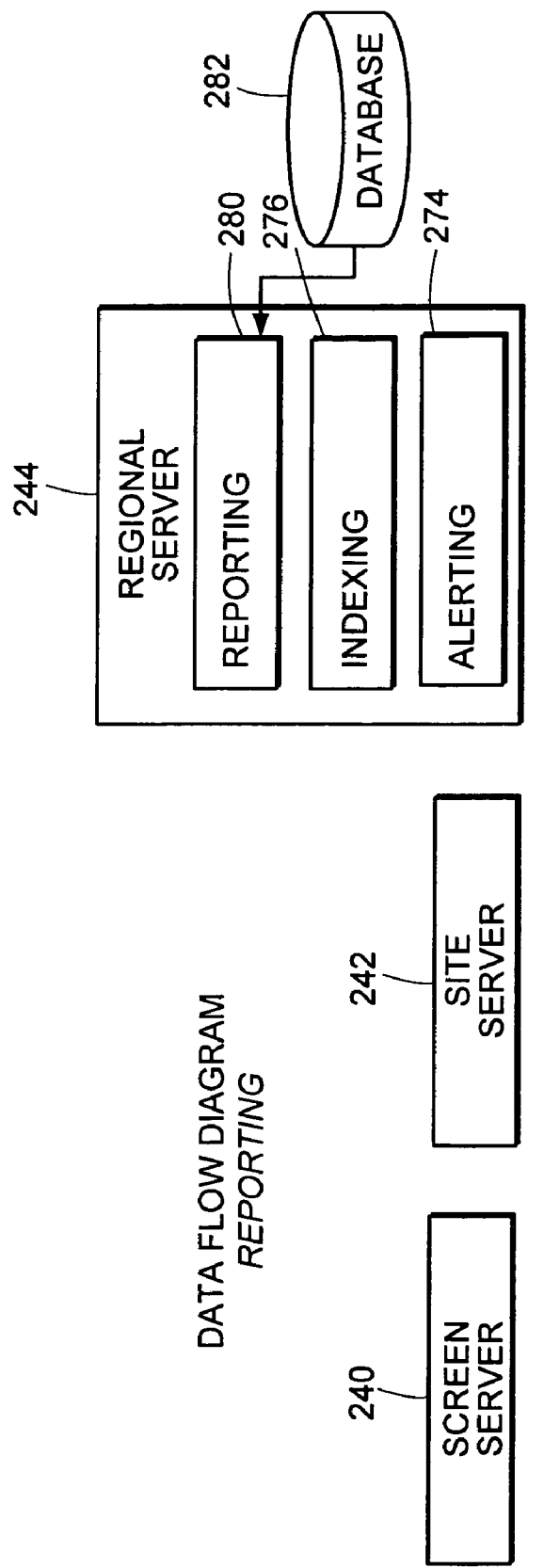
FIG. 16 shows an illustrative diagrammatic view of data flow during the reporting step in a system in accordance with an embodiment of the invention.

Signal data is logged and transferred to the regional server, which would interpret the condition and could issue an alert. Alerts are issued when auto-correction fails or when auto-correction is not an option. As shown in FIG. 15, communications between a screen server 240, site server 242 and a regional server 244 may involve the detecting, logging and transferring of data. For example, the screen server 240 may include a detecting unit 246, an interpreting unit 248, a logging unit 250, a transfer unit 252, and an auto-correction unit 254. The site server 242 may also include a detecting unit 256, an interpreting unit 258, a logging unit 260, a transfer unit 262 and an auto-correction unit 264. The regional server 244 may include an auto-correction unit 266, a detecting unit 268, a logging unit 270, a transfer unit 272, an interpreting unit 274, an alerting unit 274, an indexing unit 276, and a reporting unit 280. As shown for example, error detection data may flow from the detecting unit 246 of the screen server 240 to the logging unit 250 and in turn to the transfer unit 252. Error detection data also may flow from the detecting unit 256 of the site server 242 to the logging unit 260 and in turn to 37the transfer unit 262 together with error data from the transfer unit 252 of the screen server 240. The combined error data may then be transferred from the transfer unit 262 of the site server 242 to the transfer unit 272 of the regional server 244. Error detection data may also be transferred from the detecting unit 268 of the regional server 244 to the logging unit 270 and in turn to the transfer unit 272. The combined error data may then flow to the interpreting unit 274 and then the alerting unit 274 as well as to the indexing unit 276 as shown. Error data may then be transferred from the indexing unit 276 to the database 282 as shown. The screen server 240 will return most of the data regarding state and status of equipment. All computers can return at least network and power status data. Status data is ultimately indexed into the database. It is also subject to interpretation by the interpreting process and subject to alerting if it matches a condition known to be undesirable. As shown in FIG. 16, reporting data may then be transferred to the reporting unit 280 of the regional server 244. Alerting may take the form of a simple electronic notification and it can additionally take the form of request for service and/or request for equipment.

The alerting process is not limited to a single stream of signal data, but can also analyze multiple heterogeneous streams from the same screen server assembly. The alerting process can similarly analyze multiple homogeneous streams from a plurality of screen server assemblies. In this way, it can identify error conditions more specifically or more comprehensively.

An example of heterogeneous data analysis is the comparison of activation signal data to show schedule data. If the screen server assembly is not activated consistent with the show schedule for that cinema, then an error is indicated and an alert is generated.

Implicit error conditions are discovered by a pattern matching process that seeks breaks in the pattern of operation by show, by day, and by week. A break in the pattern is then compared to a set of know error condition patterns. If the process finds a match, then the pattern anomaly is alerted and identified. If there is no positive comparison, the pattern anomaly is alerted and flagged as suspect.

Some patterns, such as a network or power outage, can be present at more than one screen server or site server. In such cases, the pattern matching process will look for the same anomaly among its peers.

Indexing is the process of storing status data in the database along with the time/date, location and device identification. In this way, it can be retrieved and or sequenced as part of a query by device, by location and/or by date. With data and location, it can also be cross-correlated with show data that is part of the digital screen advertising system.

Electronic notification is issued primarily through email. The email is addressed to the person/party on record with the system for a particular error condition at a particular location. The subject and body of the email will address the nature of the condition detected. The body of the email may also include recommendations to correct the condition. For example, in the case where the power has gone off, it may instruct the recipient to restore power, check the circuit breaker on the UPS, check that the UPS is plugged-in, check the circuit breaker to the outlet which powers the UPS. Email can be sent to a standard email address; therefore, alerts can be sent to any cell phone, PDA, or handheld device that accepts email.

Electronic notification need not be email. Whether email or some other protocol or technology, the message can also initiate a service call and/or initiate the shipment of replacement parts/equipment. For example, if a bulb fails in a projector, the alert can cause a new bulb to be shipped to the location as well as an alert to in-theater personal to replace the bulb when the new one arrives.

Once the data has been loaded (indexed) into the database, it is available for reporting. If the database is relational, then SQL can typically be used to select ordered subsets of data for the purpose of statistical, trend and forensic analysis.

Alerts are error conditions that require operator attention and very likely require a field service call. Alerts are posted in an alert queue. The alert queue is visible to and monitored by operators. The alert is typically the starting point of an incident.

An operator will review an alert and may call the theater staff for further information. In the case of loss of connectivity the operator might ask "Did the equipment loose power?" If so, the operator would work with the theater staff to reestablish power. If not, the operator would begin troubleshooting the network and/or Screen Server PC itself with the theater staff as the eyes and hands. If the problem can be solved quickly over the phone, then the operator will document the call with the alert condition as a resolved incident. If the operator is unable to resolve the error condition with the theater staff, then the unresolved incident is documented with the alert condition and a service call is issued.

Some alert conditions bypass the operator and go straight to service call. This includes, but is not limited to, a lamp failure. Lamp failure is automatically interpreted as an alert condition requiring a service call. An unresolved incident is automatically created and a service call is issued by the service call process.

The preferred method of the service call is issued through electronic messaging. Email is used, but any electronic messaging system could be used. Emails are sent to the field service personnel specific to the region in which the equipment failure occurred and specific to the type of equipment that failed. Emails are received in a typical mailbox or, more appropriately, through wireless portable devices such as text-pagers, personal digital Aassistants (PDAs) and text-messaging capable cell phones.

Receipt of the electronic message is acknowledge either automatically through a return receipt request, or manually through an operator generated response. The response contains the unique incident identifier that is automatically read by an inbound message indexer, which adds a record of receipt to the incident stored in the database.

Once the service call has been completed and the error condition is cleared, then the service provider will close the incident by sending an electronic message containing the unique incident identifier and a keyword, cleared. The inbound message indexer will record receipt in the database and will change the state of the incident to be closed. Alternatively, the service provider can modify the incident directly through the web interface or can contact a system operator to do the same.

In some cases, such as a failed lamp at a remote location in which the theater staff is also the service provider, a new lamp will be shipped overnight to the theater. Shipment is assisted by the service call process, which notifies the theater staff of the incident and that a new lamp should be expected the next day, but also notifies the warehouse with a message that include the ship-to contact information.

There is always the possibility in an automated system that an incident will get lost or forgotten. To safeguard against this, an aging process will review unresolved incidents daily and will alert operators to any incidents that have not been attended within a preset period of time.

An incident is a record of a condition that required external intervention on the system. An incident is often created automatically such as in the case of a bulb replacement. However, incidents are also created manually, particularly in cases that require troubleshooting. An incident includes, but is not limited to, a start time, and end time, and error condition, and a resolution. Additionally, incidents almost always have a fault classification. Incidents record each step in the process of resolution including, but not limited to, alerts issued to service personnel, responses from personnel, equipment shipping requests, and help desk entries.

Reports are the result of selection and presentation of data. Relational databases typically have a query language such as SQL for accessing and sorting data according to specific attributes. The four primary attributes of the data collected by the system of the present invention are time, location and device identifier and device state. Selecting data limited to a single device and condition then sequencing according to time, one may observe the changing states of that device. Basic interpretation of the data is confirming that the states change as anticipated and flagging discrepancies. Similar analysis can be done by location. By storing the data of the system of the present invention in association with the data of the screen advertising system, discrepancies in the patterns can be associated with specific failures to deliver content (advertising jobs).

Should the digital advertising system be connected to the theaters point of sale ticket sales system (POS) and be collecting show time information from the POS, then the system of the present invention may compare actual equipment status with expected equipment status based on the start times indicated by the data from the POS.

The interface for the system of the present invention has two forms, email and direct interface. Email is used primarily for alerting while the direct interface is used primarily for signal analysis, incident management and reporting.

Figure 17:
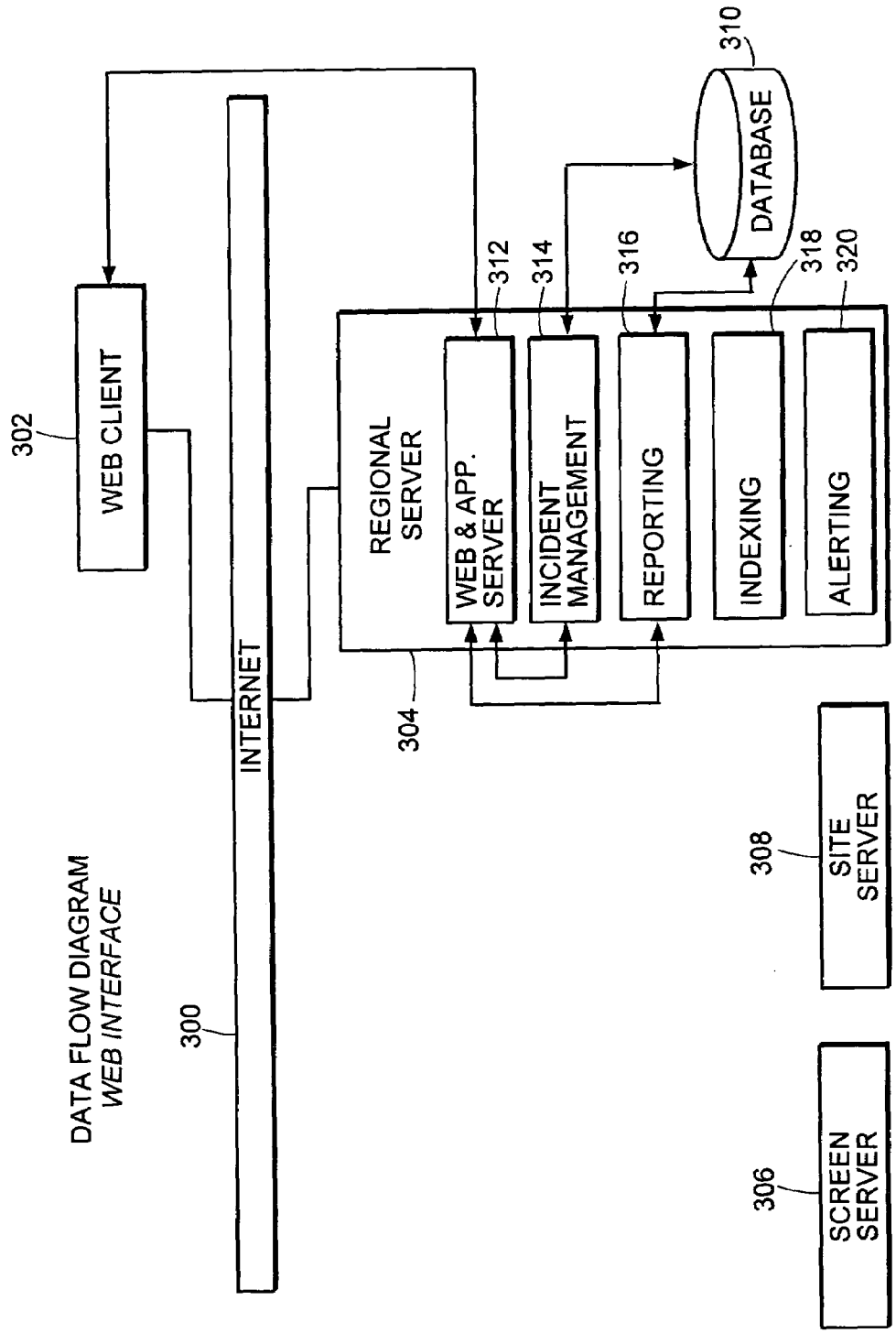
FIG. 17 shows an illustrative diagrammatic view of data flow at the web interface in a system in accordance with an embodiment of the invention.

The direct interface takes the form of a web interface to facilitate ubiquitous access by all interested parties as well as facilitate frequent updates to the software without requiring the distribution and installation of updated client software. FIG. 17 illustrates the web and application servers servicing requests from a web client on the internet. As shown, the interface includes the internet 300, the web client 302, the regional server 304, the screen server 306, the site server 308 and the database 310. The regional server 304 includes a web and applications server unit 312, an incident management unit 314, a reporting unit 316, an indexing unit 318 and an alerting unit 320. The web and application services interact with the database through business logic processes, in this case, incident management processes and reporting processes. As shown, communications and data may flow from to and from the Internet 300 to the web client 302 and the regional server 304. Data may also flow between the web client 302 and the regional server 304. Within the regional server 304, data may be transferred between the web and applications server unit 312 to and from each of the incident management unit 314 and reporting unit 316. Data may also be transferred to and from the database 310 to and from each of the reporting unit 316 and the incident management unit 314.

An alternate system and method for the present invention could be characterized as a stand-alone embodiment. In such an embodiment, the equipment may be installed specifically for the purpose of detecting and reporting error conditions with equipment in the field. Signal data may be captured by one or more computers connected to remote devices. Economics would most likely dictate a single computer, comparable to a site server, for the purpose of logging and transmitting signals and error messages back to the regional server or its equivalent. The site server or its equivalent could be directly connected to monitored equipment or could receive data via LAN from special purposed devices for the purpose of detecting and relaying state, status, condition, and activity data from the theater equipment.

The theater equipment need not be related to screen advertising, but could include state and status data of other equipment including, but not limited to, film platters, feature film projectors, feature digital projectors and supporting electronics.

Special purposed equipment can also serve as a means for resetting equipment in an attempt to clear an error condition. The rules of automatic equipment resetting could be part of the special purpose device or could be in the screen server or its equivalent in which case, the screen server or its equivalent would direct the special purposed device to reset the errant equipment.

The screen server could be replaced by a network bridge/router device that could relay data directly back to the regional server or its equivalent. In this scenario, there would be no general-purpose computer at the theater site. Rather, the theater site would be equipped purely with special purpose detection devices that are network-enabled as well as with a router/bridge device to relay data from the special purposed detection equipment back to the regional server or its equivalent. Such a solution suggests a simple communications protocol such as SNMP.

The screen server could also be replaced with a data file storage depot. Such a depot would be a general purpose computer or PC connected to the WAN and to the LAN. It would serve as the intermediary transport device, queuing outbound data files for transport over the WAN, especially when the WAN is satellite-based, but equally relevant when the WAN is terrestrial-based. Inbound data files received from the WAN are staged until a screen server or its equivalent or a special proposed device picks it up.

Figure 18:
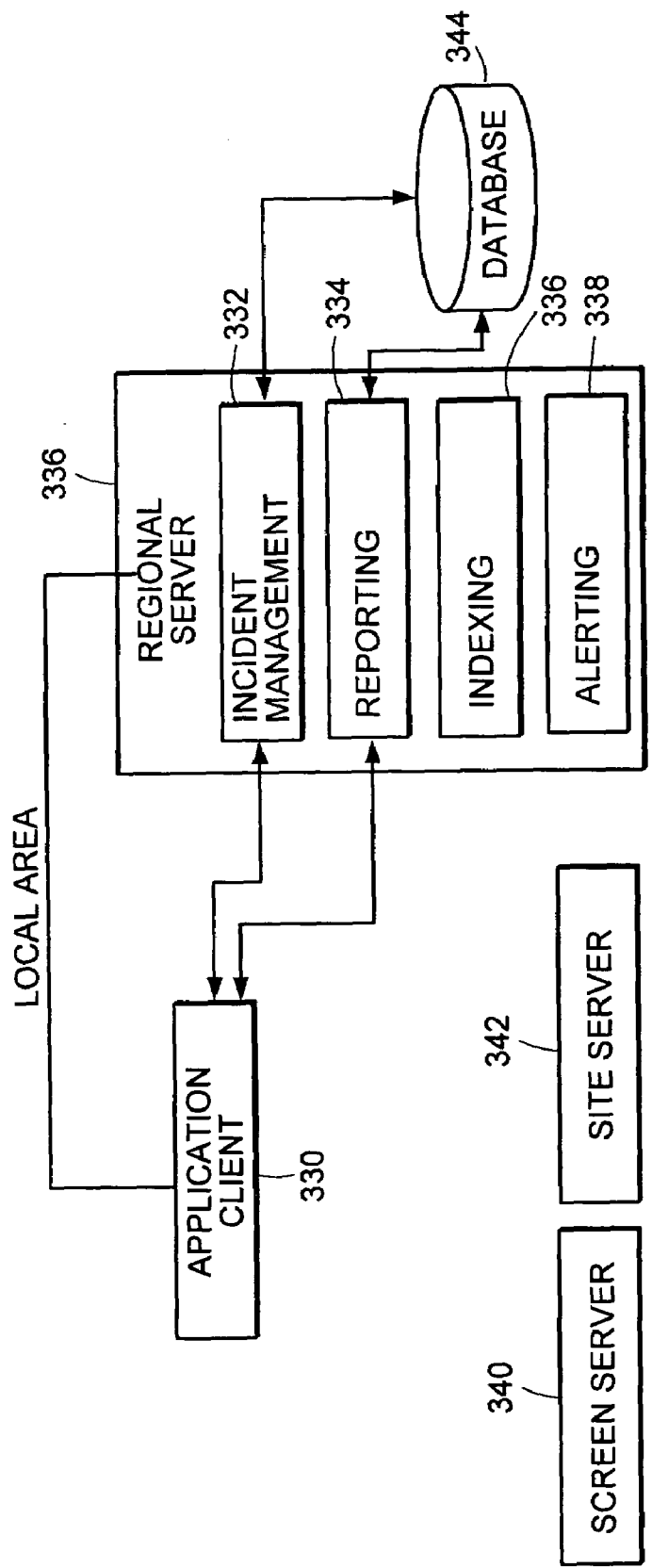
FIG. 18 shows an illustrative diagrammatic view of data flow at the client-server in a system in accordance with an embodiment of the invention.

The interface of an alternate system could be client-server system as generally shown in FIG. 18. Such a system may involve data flow directly between an application client 330 and an incident management unit 332 and a reporting unit 334 of a regional server 336. The regional server 336 also includes an indexing unit 336 and an alerting unit 338, and is connected to the application client 330 via a local area network. The system further includes a screen server 340, a site server 342 and a database 344 that communicated with the incident management unit 332 and the reporting unit 334 as shown. In this case, communication is facilitated over the local area network (LAN). The client software is custom software that accesses the business logic on the server, which in turn accesses the data in the database. The business logic in this three-tier application could reside in a transaction server or other type of application server. Many database management systems include a business logic layer which could also harbor the incident management and reporting processes. Finally, in a two-tier architecture, the business logic would be resident in the application client.

Those skilled in the art will appreciate that numerous modifications and variations may be made to the above disclosed embodiments without departing from the spirit and scope of the invention.

What is claimed is:

1. A system for determining equipment status based upon data representative of movie theatre equipment state changes, said system comprising:

a central computer storage unit for retrieving and storing data representative of theatre equipment status;

said central computer storage unit including known status data representative of a plurality of state change patterns representing known status;

comparator means for comparing a first state change pattern representative of equipment state changes in state of a theatre audio processing unit to said known status data in said central computer storage unit and for providing comparison data;

alert means for providing alert condition data responsive to said comparison data; and storage means for receiving said comparison data and for storing said comparison data.

2. The system as claimed in claim 1, wherein said first state change pattern is further representative of changes in state of a theatre projection unit.

3. The system as claimed in claim 1, wherein said first state change pattern is further representative of changes in state of a theatre power source.

4. The system as claimed in claim 1, wherein said first state change pattern is further representative of changes in state of a plurality of a theatre projection unit, a theatre audio processing unit and a theatre power source for a period of time.

5. The system as claimed in claim 1, wherein said first state change pattern is a timing chart pattern of at least two units of equipment for a period of time during which at least one of the units of equipment completes a cycle of operation.

6. A system for determining equipment status based upon data representative of movie theatre equipment state changes, said system comprising:

a central computer storage unit for retrieving and storing data representative of theatre equipment status, said central computer storage unit including known status data representative of a plurality of state change patterns representing known status for each of a plurality of remote theatre screen assemblies;

comparator means for comparing a first state change pattern of a first theatre screen assembly representative of equipment state changes in state of a theatre audio processing unit in said first screen assembly to said known status data in said central computer storage unit and for providing first screen assembly comparison data, and for comparing a second state change pattern of a second theatre screen assembly representative of equipment state changes in said second screen assembly to said known status data in said central computer storage unit and for providing second screen assembly comparison data;

alert means for providing alert condition data responsive to at least one of said first and second screen assembly comparison data; and storage means for receiving and storing said first screen assembly comparison data and said second screen assembly comparison data.

7. The system as claimed in claim 6, wherein said first state change pattern is further representative of changes in state of a theatre projection unit.

8. The system as claimed in claim 6, wherein said first state change pattern is further representative of changes in state of a theatre power source.

9. The system as claimed in claim 6, wherein said first state change pattern is further representative of changes in state of a plurality of a theatre projection unit, a theatre audio processing unit and a theatre power source for a period of time.

10. The system as claimed in claim 6, wherein said first state change pattern is a timing chart pattern of at least two units of equipment for a period of time during which at least one of the units of equipment completes a cycle of operation.

11. The system as claimed in claim 6, wherein said system further provides alert condition data response to said first screen assembly comparison data and said second screen assembly comparison data.

12. A system for determining equipment status based upon data representative of movie theatre equipment state changes, said system comprising:

a central computer storage unit for retrieving and storing data representative of theatre equipment status, said central computer storage unit including known status data representative of a plurality of state change patterns representing known status for each of a plurality of remote theatre sites;

comparator means for comparing a first state change pattern of a first theatre site representative of equipment state changes in said first theatre site to said known status data in said central computer storage unit and for providing first theatre site comparison data, wherein said first state change pattern is representative of changes in state of a plurality of a theatre projection unit, a theatre audio processing unit and a theatre power source for a period of time;

alert means for providing alert condition data responsive to said first theatre site comparison data; and storage means for receiving said first theatre site comparison data and for storing said first theatre site comparison data.

13. The system as claimed in claim 12, wherein said first theatre site includes a plurality of theatre screen assemblies.

14. The system as claimed in claim 13, wherein each said theatre screen assembly provides to the associated theatre site data representative of the status of equipment at the theatre screen assembly.

15. The system as claimed in claim 12, wherein said first state change pattern is a timing chart pattern of at least two units of equipment for a period of time during which at least one of the units of equipment completes a cycle of operation.

16. A system for determining equipment status based upon data representative of movie theatre equipment state changes, said system comprising:

a central computer storage unit for retrieving and storing data representative of theatre equipment status;

said central computer storage unit including known status data representative of a plurality of state change patterns representing known status;

comparator means for comparing a first state change pattern representative of equipment state changes in state of a theatre power source to said known status data in said central computer storage unit and for providing comparison data;

alert means for providing alert condition data responsive to said comparison data; and storage means for receiving said comparison data and for storing said comparison data.

17. A system for determining equipment status based upon data representative of movie theatre equipment state changes, said system comprising:

a central computer storage unit for retrieving and storing data representative of theatre equipment status;

said central computer storage unit including known status data representative of a plurality of state change patterns representing known status;

comparator means for comparing a first state change pattern representative of changes in state of a plurality of a theatre projection unit, a theatre audio processing unit and a theatre power source for a period of time to said known status data in said central computer storage unit and for providing comparison data;

alert means for providing alert condition data responsive to said comparison data; and storage means for receiving said comparison data and for storing said comparison data.

18. A system for determining equipment status based upon data representative of movie theatre equipment state changes, said system comprising:

a central computer storage unit for retrieving and storing data representative of theatre equipment status;

said central computer storage unit including known status data representative of a plurality of state change patterns representing known status;

comparator means for comparing a first state change pattern representative of equipment state changes to said known status data in said central computer storage unit and for providing comparison data, said first state change pattern is a timing chart pattern of at least two units of equipment for a period of time during which at least one of the units of equipment completes a cycle of operation;

alert means for providing alert condition data responsive to said comparison data; and storage means for receiving said comparison data and for storing said comparison data.

19. A system for determining equipment status based upon data representative of movie theatre equipment state changes, said system comprising:

a central computer storage unit for retrieving and storing data representative of theatre equipment status, said central computer storage unit including known status data representative of a plurality of state change patterns representing known status for each of a plurality of remote theatre screen assemblies;

comparator means for comparing a first state change pattern of a first theatre screen assembly representative of equipment state changes in state of a theatre power source in said first screen assembly to said known status data in said central computer storage unit and for providing first screen assembly comparison data, and for comparing a second state change pattern of a second theatre screen assembly representative of equipment state changes in said second screen assembly to said known status data in said central computer storage unit and for providing second screen assembly comparison data;

alert means for providing alert condition data responsive to at least one of said first and second screen assembly comparison data; and storage means for receiving and storing said first screen assembly comparison data and said second screen assembly comparison data.

20. A system for determining equipment status based upon data representative of movie theatre equipment state changes, said system comprising:

a central computer storage unit for retrieving and storing data representative of theatre equipment status, said central computer storage unit including known status data representative of a plurality of state change patterns representing known status for each of a plurality of remote theatre screen assemblies;

comparator means for comparing a first state change pattern of a first theatre screen assembly representative of equipment state changes in state of a plurality of a theatre projection unit, a theatre audio processing unit and a theatre power source for a period of time in said first screen assembly to said known status data in said central computer storage unit and for providing first screen assembly comparison data, and for comparing a second state change pattern of a second theatre screen assembly representative of equipment state changes in said second screen assembly to said known status data in said central computer storage unit and for providing second screen assembly comparison data;

alert means for providing alert condition data responsive to at least one of said first and second screen assembly comparison data; and storage means for receiving and storing said first screen assembly comparison data and said second screen assembly comparison data.

21. A system for determining equipment status based upon data representative of movie theatre equipment state changes, said system comprising:

a central computer storage unit for retrieving and storing data representative of theatre equipment status, said central computer storage unit including known status data representative of a plurality of state change patterns representing known status for each of a plurality of remote theatre screen assemblies;

comparator means for comparing a first state change pattern of a first theatre screen assembly representative of equipment state changes in said first screen assembly to said known status data in said central computer storage unit and for providing first screen assembly comparison data, and for comparing a second state change pattern of a second theatre screen assembly representative of equipment state changes in said second screen assembly to said known status data in said central computer storage unit and for providing second screen assembly comparison data, wherein said first state change pattern is a timing chart pattern of at least two units of equipment for a period of time during which at least one of the units of equipment completes a cycle of operation; and storage means for receiving and storing said first screen assembly comparison data and said second screen assembly comparison data.

22. A system for determining equipment status based upon data representative of movie theatre equipment state changes, said system comprising:

a central computer storage unit for retrieving and storing data representative of theatre equipment status, said central computer storage unit including known status data representative of a plurality of state change patterns representing known status for each of a plurality of remote theatre screen assemblies;

comparator means for comparing a first state change pattern of a first theatre screen assembly representative of equipment state changes in said first screen assembly to said known status data in said central computer storage unit and for providing first screen assembly comparison data, and for comparing a second state change pattern of a second theatre screen assembly representative of equipment state changes in said second screen assembly to said known status data in said central computer storage unit and for providing second screen assembly comparison data; and storage means for receiving and storing said first screen assembly comparison data and said second screen assembly comparison data, wherein said system further provides alert condition data responsive to said first screen assembly comparison data and said second screen assembly comparison data.

23. A system for determining equipment status based upon data representative of movie theatre equipment state changes, said system comprising:

a central computer storage unit for retrieving and storing data representative of theatre equipment status, said central computer storage unit including known status data representative of a plurality of state change patterns representing known status for each of a plurality of remote theatre sites;

comparator means for comparing a first state change pattern of a first theatre site representative of equipment state changes in said first theatre site to said known status data in said central computer storage unit and for providing first theatre site comparison data, wherein said first state change pattern is a timing chart pattern of at least two units of equipment for a period of time during which at least one of the units of equipment completes a cycle of operation;

alert means for providing alert condition data responsive to said first theatre site comparison data; and storage means for receiving said first theatre site comparison data and for storing said first theatre site comparison data.

* * * * *

UNITED STATES PATENT AND TRADEMARK OFFICE
CERTIFICATE OF CORRECTION

PATENT NO. : 7,143,010 B2 Page 1 of 1
APPLICATION NO. : 11/248344
DATED : November 28, 2006
INVENTOR(S) : David H. Sprogis and Dan U. Zehme It is certified that error appears in the above-identified patent and that said Letters Patent is hereby corrected as shown below:

On the title page, please add:

Item --[60]
      Related U.S. Application Data

Continuation of application No. 10/738,875, filed on Dec. 17, 2003, now Pat. No. 6,983,225, which claims priority to Provisional application No. 60/435,164, filed on Dec. 20, 2002.--

In Col. 7, line 22, please delete "371" and replace with "1".

In Col. 7, line 57, please delete "3".

In Col. 11, line 5, please delete "3".

In Col. 11, line 65, please delete "37".

In Col. 12, line 56, please delete "37".

Signed and Sealed this

Ninth Day of January, 2007

JON W. DUDAS
*Director of the United States Patent and Trademark Office*